US012424404B2

(12) United States Patent
Holp et al.

(10) Patent No.: US 12,424,404 B2
(45) Date of Patent: Sep. 23, 2025

(54) THOMSON COIL WITH ENERGIZED COIL DAMPING

(71) Applicant: EATON INTELLIGENT POWER LIMITED, Dublin (IE)

(72) Inventors: Tyler Holp, Coraopolis, PA (US); Brad R. Leccia, Bethel Park, PA (US); Steven Z. Chen, Coraopolis, PA (US); Xin Zhou, Wexford, PA (US); Andrew W. Lichauer, Moon Township, PA (US); Koustubh D. Ashtekar, Coraopolis, PA (US); Michael Slepian, Murrysville, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 444 days.

(21) Appl. No.: 17/087,883

(22) Filed: Nov. 3, 2020

(65) Prior Publication Data

US 2022/0139654 A1 May 5, 2022

(51) Int. Cl.

| | |
|---|---|
| ***H01H 3/22*** | (2006.01) |
| ***H01H 50/18*** | (2006.01) |
| ***H01H 50/44*** | (2006.01) |
| ***H01H 50/54*** | (2006.01) |

(52) U.S. Cl.

CPC ............ *H01H 50/18* (2013.01); *H01H 3/222* (2013.01); *H01H 50/44* (2013.01); *H01H 50/54* (2013.01)

(58) Field of Classification Search

CPC ...................................................... H01H 3/222

See application file for complete search history.

(56) References Cited

U.S. PATENT DOCUMENTS

| | | | | |
|---|---|---|---|---|
| 4,272,661 A * | 6/1981 | Dethlefsen | H01H 3/222 335/147 |
| 4,292,611 A * | 9/1981 | Bresson | H01H 3/222 335/147 |
| 6,580,345 B2 * | 6/2003 | Akita | H01H 33/285 335/148 |
| 7,235,751 B2 * | 6/2007 | Liljestrand | H01H 9/42 200/239 |
| 8,791,779 B2 * | 7/2014 | Jonsson | H01H 50/323 335/121 |
| 10,580,599 B1 * | 3/2020 | Wang | H01F 7/0231 |
| 2015/0235784 A1 * | 8/2015 | Karlstrom | H01H 33/285 218/140 |
| 2020/0194206 A1 * | 6/2020 | Wang | H01H 3/54 |

* cited by examiner

*Primary Examiner* — Alexander Talpalatski

(74) *Attorney, Agent, or Firm* — Eckert Seamans Cherin & Mellott, LLC

(57) ABSTRACT

Coil-based actuators for use in opening and closing the separable contacts of circuit interrupters provide increased initial velocity for opening strokes and improved damping at the end of opening strokes by utilizing current-based damping and omitting contact springs and contact dampeners.

9 Claims, 10 Drawing Sheets

THOMSON COIL WITH ENERGIZED COIL DAMPING

BACKGROUND

Field

The disclosed concept relates generally to actuators used to open and close switches, and in particular, actuators used to open and close switches in circuit interrupters.

Background Information

Circuit interrupters, such as for example and without limitation, circuit breakers, are typically used to protect electrical circuitry from damage due to an overcurrent condition, such as an overload condition, a short circuit, or another fault condition, such as an arc fault or a ground fault. Circuit interrupters typically include separable electrical contacts, which operate as a switch. When the separable contacts are in contact with one another in a closed state, current is able to flow through any circuits connected to the circuit interrupter. When the separable contacts are not in contact with one another in an open state, current is prevented from flowing through any circuits connected to the circuit interrupter. The separable contacts may be operated either manually by way of an operator handle, remotely by way of an electrical signal, or automatically in response to a detected fault condition. Typically, such circuit interrupters include an actuator designed to rapidly close or open the separable contacts, and a trip mechanism, such as a trip unit, which senses a number of fault conditions to trip the separable contacts open automatically using the actuator. Upon sensing a fault condition, the trip unit trips the actuator to move the separable contacts to their open position.

Some circuit interrupters such as, for example, power circuit breakers, employ vacuum interrupters as the switching devices. The separable electrical contacts usually included in vacuum interrupters are generally disposed on the ends of corresponding electrodes within an insulating housing that forms a vacuum chamber. Typically, one of the contacts is fixed relative to both the housing and to an external electrical conductor, which is electrically interconnected with a power circuit associated with the vacuum interrupter. The other contact is part of a movable contact assembly including an electrode stem of circular cross-section and a contact disposed on one end of the electrode stem and enclosed within a vacuum chamber. A driving mechanism is disposed on the other end, external to the vacuum chamber. When the trip unit detects a fault condition, the trip unit trips the actuator to cause the driving mechanism to open the separable contacts within the vacuum chamber. After the fault condition has resolved, the trip unit signals the actuator to cause the driving mechanism to drive the separable contacts closed within the vacuum chamber.

In medium and high voltage electrical systems in particular, the actuator of the circuit interrupter needs to be capable of driving the separable contacts open quickly in order to mitigate the effects of a fault condition. However, the force required to open the separable contacts quickly is significant due to the mass of the components that must be moved in order to open the separable contacts, and this force can potentially damage any components connected to the driving mechanism at the end of the opening stroke. In addition, closing separable contacts quickly also requires significant force which can result in significant wear and tear on the separable contacts upon closing, necessitating that the separable contacts be replaced when they can no longer be relied upon to function properly.

There is thus room for improvement within actuators in circuit interrupters.

SUMMARY

These needs and others are met by embodiments of the disclosed concept in which a number of conductive coils electrically connected to a current source and a number of conductive plates are structured to provide increased initial velocity for moving assemblies of circuit interrupters during opening strokes and faster damping at the conclusion of opening strokes. These needs and other are also met by embodiments of the disclosed concept in which the circuit interrupter does not include a contact spring within the moving assembly and does not include a mechanical damping mechanism to dampen opening strokes of the circuit interrupter.

In accordance with one aspect of the disclosed concept, an actuator comprises: a shaft; a first coil member having an opening through which the shaft passes; and a first eddy current member having an opening through which the shaft passes and coupled to the shaft at a location disposed above the first coil member; a second coil member having an opening through which the shaft passes and disposed above the first eddy current member, wherein the shaft and first eddy current member are structured to move in response to a force exerted on the first eddy current member, wherein the first coil member is structured to be electrically connected to a first current source, wherein the first eddy current member is structured to stop moving in response to changes in a damping current supplied to the first coil member, wherein the second coil member is structured to be electrically connected to a second current source, and wherein the first eddy current member is structured to move in response to changes in a current supplied to the second coil member.

In accordance with another aspect of the disclosed concept, an actuator comprises: a shaft; a first coil member having an opening through which the shaft passes; a first eddy current member having an opening through which the shaft passes and coupled to the shaft at a location disposed above the first coil member; a second coil member having an opening through which the shaft passes and disposed above the first eddy current member; and a solenoid core having an opening through which the shaft passes and disposed between the opening of the first coil member and the shaft, wherein the shaft and first eddy current member are structured to move in response to a force exerted on the first eddy current member; wherein the first coil member is structured to be electrically connected to a first current source, wherein the first eddy current member is structured to stop moving in response to changes in a damping current supplied to the first coil member, wherein the first coil member comprises a solenoid, wherein the second coil member is structured to be electrically connected to a second current source, and wherein the first eddy current member is structured to move in response to changes in a current supplied to the second coil member.

In accordance with another aspect of the disclosed concept, an actuator comprises: a shaft; a first coil member having an opening through which the shaft passes; a first eddy current member having an opening through which the shaft passes and coupled to the shaft at a location disposed above the first coil member; a second eddy current member having an opening through which the shaft passes and coupled to the shaft at a location disposed beneath the first coil member, wherein the shaft and first eddy current member are structured to move in response to a force exerted on the first eddy current member, wherein the first coil member is structured to be electrically connected to a first current source, wherein the first eddy current member is structured to stop moving in response to changes in a damping current supplied to the first coil member, and wherein the second eddy current member is structured to move in response to changes in a current supplied to the first coil member.

In accordance with one aspect of the disclosed concept, an actuator comprises: a shaft; a first coil member having an opening through which the shaft passes; a first eddy current member having an opening through which the shaft passes and coupled to the shaft at a location disposed above the first coil member; a second coil member having an opening through which the shaft passes and disposed above the first eddy current member; and a second eddy current member comprising an opening through which the shaft passes and coupled to the shaft at a location disposed beneath the first coil member, wherein the shaft and first eddy current member are structured to move in response to a force exerted on the first eddy current member, wherein the first coil member is structured to be electrically connected to a first current source, wherein the first eddy current member is structured to stop moving in response to changes in a damping current supplied to the first coil member, wherein the second coil member is structured to be electrically connected to a second current source, wherein the first eddy current member is structured to move in response to changes in a current supplied to the second coil member, and wherein the second eddy current member is structured to move in response to changes in a current supplied to the first coil member.

In accordance with another aspect of the disclosed concept, an actuator comprises: a shaft; a coil member having an opening through which the shaft passes; a first eddy current member having an opening through which the shaft passes and coupled to the shaft at a location disposed beneath the coil member; and a second eddy current member having an opening through which the shaft passes and disposed beneath the first eddy current member, wherein the coil member is structured to be electrically connected to a current source, wherein the first eddy current member is structured to move in response to changes in a current supplied to the coil member, wherein the first eddy current member is structured to generate eddy currents in the second eddy current member, and wherein the first eddy current member is structured to stop moving in response to changes in the eddy currents generated in the second eddy current member.

In accordance with another aspect of the disclosed concept, an actuator comprises: a shaft; a coil member having an opening through which the shaft passes; an eddy current member coupled to the shaft at a location disposed beneath the first coil member; and a conductive open cylinder disposed around the shaft and disposed beneath the first eddy current member, wherein the shaft and eddy current member are structured to move in response to changes in a current supplied to the coil member, wherein a number of permanent magnets are embedded within the eddy current member, and wherein the open cylinder is structured to generate eddy currents when a magnetic field produced by the eddy current member is changing.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1B:
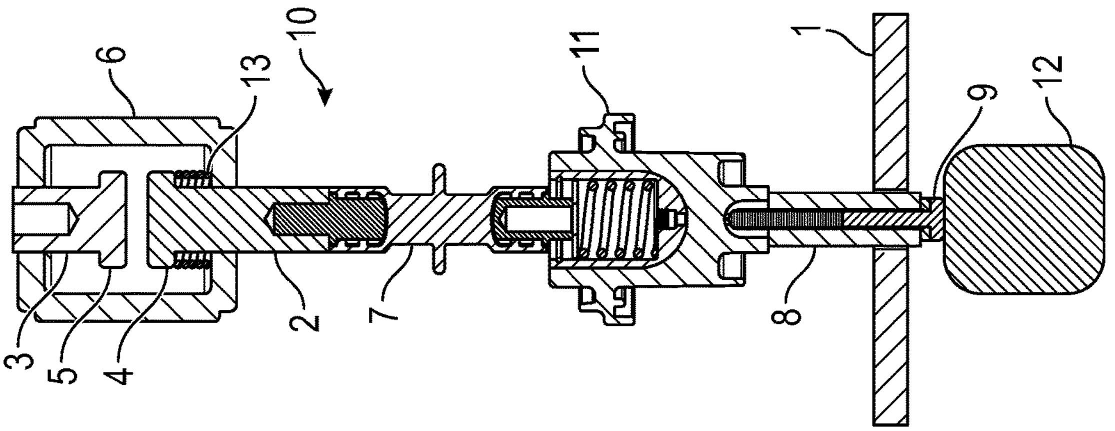
FIGS. 1A and 1B are diagrams of a schematically depicted actuator connected to a vacuum circuit interrupter.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

As used herein, the singular form of "a", "an", and "the" include plural references unless the context clearly dictates otherwise.

As used herein, the term "contact dampener" shall mean a mechanism used to dampen the velocity of any moving components of a circuit interrupter that move in order to open the separable contacts of a circuit interrupter, wherein said mechanism achieves damping by making contact with and causes an impact with said moving components.

As used herein, the term “damping current” shall mean a current supplied to a component of a coil actuator in order to dampen an opening or closing stroke of a circuit interrupter.

As used herein, the statement that two or more parts or components are “coupled” shall mean that the parts are joined or operate together either directly or indirectly, i.e., through one or more intermediate parts or components, so long as a link occurs. As used herein, “directly coupled” means that two elements are directly in contact with each other. As used herein, “fixedly coupled” or “fixed” means that two components are coupled so as to move as one while maintaining a constant orientation relative to each other.

As employed herein, the term “processing unit” or “processor” shall mean a programmable analog and/or digital device that can store, retrieve, and process data; a microprocessor; a microcontroller; a microcomputer; a central processing unit; or any suitable processing device or apparatus.

Figure 1A:
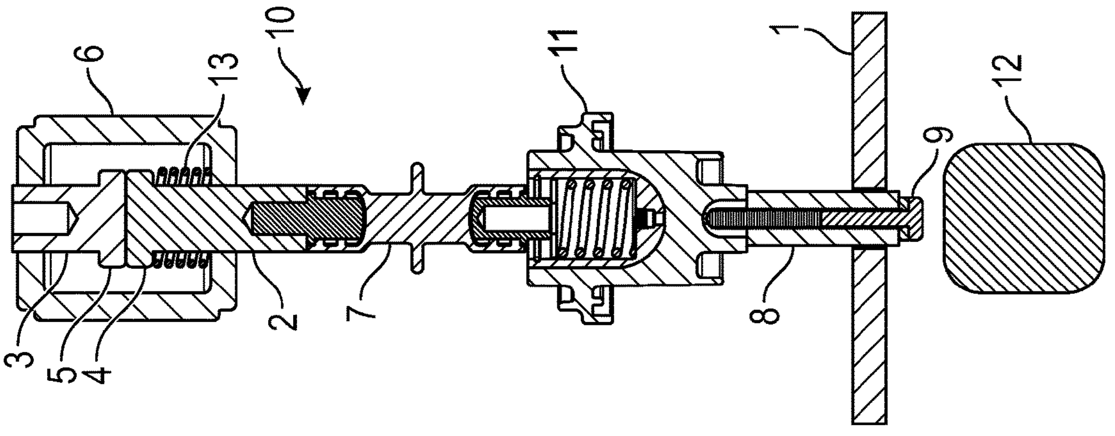

FIGS. 1A and 1B are diagrams depicting how a schematic actuator can be connected to a moving assembly to drive a pair of separable contacts of a circuit interrupter between open and closed states. A moving assembly 10 comprises a moving stem 2, a drive rod assembly 7, an actuator shaft 8, a contact spring assembly 11, and the moving components of a schematic actuator 1, all coupled to one another as shown. The moving stem 2 includes a separable contact 4. A fixed stem 3 includes a separable contact 5. The separable contacts 4, 5 are enclosed within a vacuum housing 6. The fixed stem 3 is fixed relative to both the vacuum housing 6 and an external electrical conductor, which is electrically interconnected with a power circuit supplying power to the circuit interrupter. Drive rod assembly 7 comprises an insulating cover that shields schematic actuator 1 from high voltage levels of the power circuit supplying power to the circuit interrupter. It will be appreciated that the setup shown in FIGS. 1A and 1B would be connected to one phase of power in a three-phase power system, such that three of the setups shown in FIGS. 1A and 1B would be used for a three-phase power system.

FIG. 1A depicts the separable contacts 4, 5 in a closed state, which occurs when no fault condition is detected in the circuit interrupter. In the closed state, the separable contacts 4, 5 are said to be closed and are disposed in contact with one another such that electric current can flow between the moving stem 2 and the fixed stem 3. In contrast, FIG. 1B depicts the separable contacts 4, 5 in an open state, which occurs when a trip unit (not shown) senses a fault condition in the circuit interrupter and causes schematic actuator 1 to drive the moving assembly 10 and the separable contact 4 away from the fixed stem 3 and the separable contact 5. In the open state, the separable contacts 4, 5 are said to be open and electric current is prevented from flowing between the moving stem 2 and fixed stem 3. A latch 9 disposed beneath schematic actuator 1 is often included to assist in maintaining the open state by engaging with a latching assembly disposed underneath latch 9 (not shown) such that the moving assembly 10 is kept separated from the fixed stem 3 until the fault condition is resolved. An opening stroke occurs when the moving assembly 10 moves from the closed state to the open state, and a closing stroke occurs when the moving assembly 10 moves from the open state to the closed state.

A contact dampener 12 (shown schematically) such as a shock absorber or spring dampener is typically used beneath the schematic actuator 1 in order to dampen the velocity of an opening stroke as the moving assembly 10 approaches its final position in the open state. Damping occurs upon impact of the schematic actuator 1 with the contact dampener 12. Damping is necessary to prevent the moving assembly 10 from opening a greater distance than is necessary. Opening the moving assembly 10 too great a distance increases the risk of overstretching and reducing the life of the bellows 13 that provide a flexible joint between the separable contact 4 and the interior of the vacuum housing 6, as well as the risk of restrike, which can occur if the moving assembly 10 impacts any fixed components located beneath the schematic actuator with enough force to bounce back up and reclose separable contacts 4, 5 instead of keeping separable contacts 4, 5 open. Contact spring assembly 11 serves to dampen the force with which moving assembly closes separable contacts 4, 5 during a closing stroke, whether the closing stroke is due to an unintended restrike or an intentional reclosing after a fault condition has been cleared.

Figure 2B:
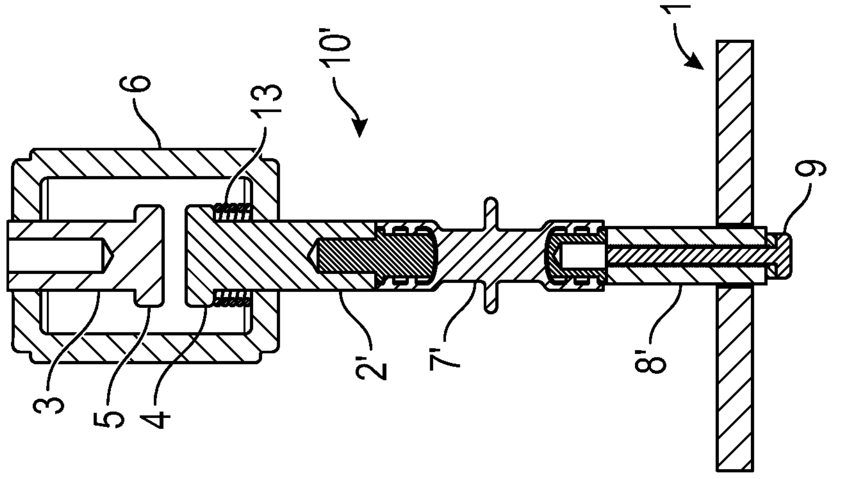
FIGS. 2A and 2B are diagrams of a schematically depicted actuator connected to a vacuum circuit interrupter in accordance with an example embodiment of the disclosed concept.
Figure 2A:
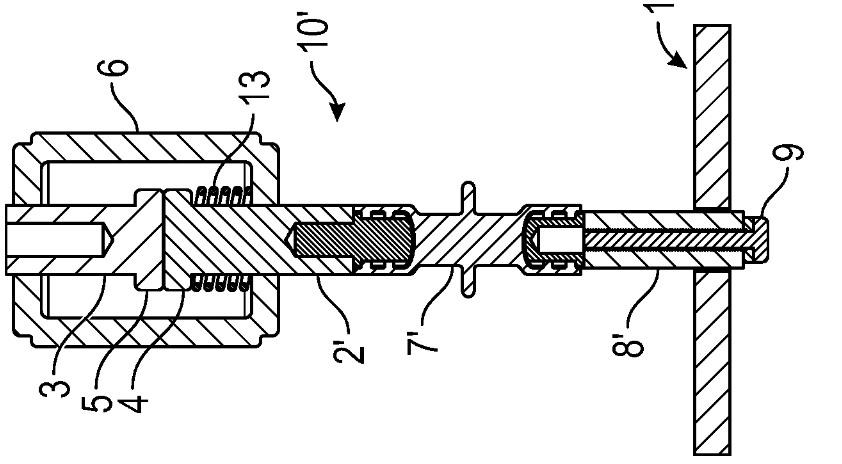

Increasing the maximum velocity at which a circuit interrupter can open its separable contacts upon detection of a fault condition is a perpetual objective in the relevant field. In pursuit of this objective, FIGS. 2A and 2B show a circuit interrupter comprising several of the same components as the circuit interrupter shown in FIGS. 1A and 1B, but which comprises a moving assembly 10' instead of a moving assembly 10 and omits the contact dampener 12, in accordance with an example embodiment of the disclosed concept. The moving assembly 10' omits contact spring assembly 11 and comprises a moving stem 2', a drive rod assembly 7', an actuator shaft 8', and the moving components of schematic actuator 1.

While the inclusion of contact spring assembly 11 in the moving assembly 10 as shown in FIGS. 1A and 1B prevents accelerated wear and tear on the moving assembly 10, moving assembly 10' omits contact spring assembly 11 because it increases the mass of the moving assembly 10 and thereby decreases the maximum velocity at which the schematic actuator 1 can open separable contacts 4, 5. To further reduce the mass of moving assembly 10, the actuator shaft 8', drive rod assembly 7', and moving stem 2' of moving assembly 10' are produced to be ultralight versions of the actuator shaft 8, drive rod assembly 7, and moving stem 2, respectively. However, the omission of contact spring assembly 11 and use of ultralight components in the lightweight moving assembly 10' renders the moving assembly 10' less robust and therefore less able to withstand impact than a typical moving assembly 10, necessitating the use of damping mechanisms gentler than a contact dampener 12. The present disclosure presents several example embodiments of coil actuators that provide damping mechanisms well-suited to damping lightweight moving assemblies such as moving assembly 10'. The inclusion of the latch 9 in the setup shown in FIGS. 2A and 2B is optional in several of the example embodiments, as the omission of contact spring assembly 11 may eliminate the need for a latch 9 depending on the specific embodiment of the actuator used in place of the schematic actuator 1.

FIGS. 3A-3D show partial isometric views of a hypothetical coil 51 and a hypothetical conductive current plate 52 to illustrate the electromagnetic effects produced when a time-varying current is supplied to a conductor wound into a coil and said coil is proximate to a conductive plate. Actuators comprised of a conductive coil (such as coil 51) electrically connected to a current source such that changes to the current flowing through the coil causes movement of a nearby conductive object (such as plate 52) are known as Thomson coil actuators in the relevant field. The descriptions of subsequent figures in the present disclosure, which present various exemplary embodiments of coil actuators, refer to the magnetic field diagrams of FIGS. 3A-3D to explain how similar electromagnetic forces behave in the various exemplary embodiments presented.

Together, coil 51 and plate 52 comprise a hypothetical coil actuator 53 such as schematic actuator 1 in FIGS. 2A and 2B, and are representative of the conductive coils and conductive eddy current plates used in various coil actuators shown in subsequent figures and described subsequently in the present disclosure. Coil 51 comprises a conductor wound into a coil that lies generally flat. Plate 52 comprises a plate produced from any electrically conductive material that lies generally flat. Both coil 51 and plate 52 comprise an opening through which a hypothetical actuator shaft (not shown), such as actuator shaft 8' in FIGS. 2A and 2B, is disposed. Coil 51 is fixedly positioned relative to the space surrounding the coil actuator 53 and is electrically connected to a current source (not shown) such that the current supplied to the coil 51 can be selectively adjusted and turned on and off by a processor (not shown). Plate 52 is coupled to the shaft such that the exertion of upward or downward forces on the plate 52 causes corresponding upward or downward movement of the shaft.

Figure 3A:
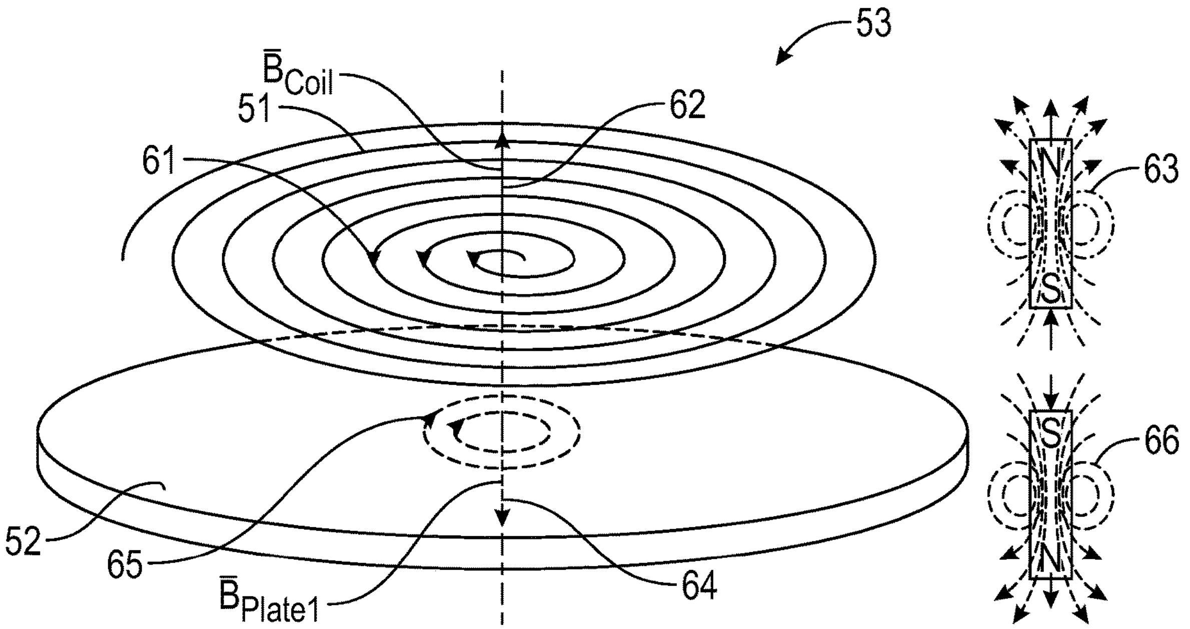
FIGS. 3A-3B are diagrams of magnetic fields produced when an increasing current is supplied to a coil actuator as described throughout the present disclosure.

FIG. 3A illustrates how a change in current supplied to a coil such as coil 51 can be used to repel a conductive plate such as plate 52 disposed beneath coil 51. A current $I_{coil}$ supplied to coil 51 by the current source flows in the direction indicated by arrow 61. When the current source supplies an increasing current $I_{coil}$ to coil 51 (i.e. $dI_{coil}/dt>0$), the magnetic flux $\Phi_{coil}$ of the magnetic field $B_{coil}$ created by the flow of $I_{coil}$ through coil 51 also increases in the direction shown by arrow 62, in accordance with the right hand rule. Magnetic field lines 63 are representative of magnetic field $B_{coil}$. In accordance with Lenz's law, eddy currents $I_{eddy}$ induced in plate 52 due to a change in magnetic field $B_{coil}$ will be oriented so as to oppose the change in flux of magnetic field $B_{coil}$. Because the change in flux $\Phi_{coil}$ of magnetic field $B_{coil}$ is an increase in flux oriented in the direction indicated by arrow 62, the eddy currents $I_{eddy}$ induced in plate 52 must flow in a direction that creates a magnetic field $B_{plate}$ with a magnetic flux $\Phi_{plate}$ oriented in the direction indicated by arrow 64. As a result, the eddy currents $I_{eddy}$ induced in plate 52 must flow in the direction indicated by arrow 65, in accordance with the right hand rule. The magnetic field lines 66 are representative of magnetic field $B_{plate}$. The magnetic fields induced in coil 51 and plate 52 are oriented in opposition to one another, as demonstrated by magnetic field lines 63 and 66, causing plate 52 to be repelled away from coil 51. The repulsion between magnetic field $B_{plate}$ and magnetic field $B_{coil}$ repels plate 52 downward away from coil 51 and causes plate 52 to drive the shaft downward as well.

Figure 3B:
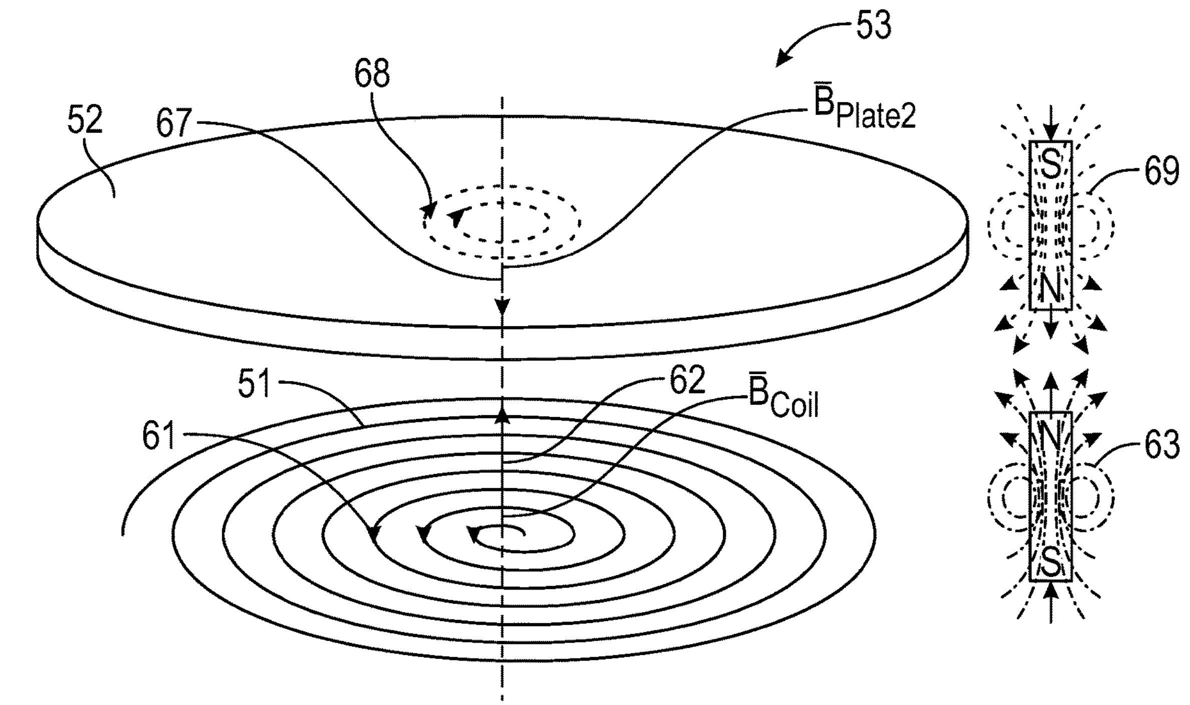

FIG. 3B illustrates how a change in current supplied to a coil such as coil 51 can be used to repel a conductive plate such as plate 52 when plate 52 is disposed above coil 51 rather than beneath coil 51. When a current $I_{coil}$ supplied to coil 51 flows in the direction indicated by arrow 61 and $I_{coil}$ is increasing (i.e. $dI_{coil}/dt>0$), Lenz's law dictates that the eddy currents $I_{eddy}$ induced in plate 52 must flow in a direction that creates a magnetic field $B_{plate}$ with a magnetic flux $\Phi_{plate}$ oriented in the direction indicated by arrow 67 to oppose the increase in flux $\Phi_{coil}$ orientated in the direction indicated by arrow 62. As a result, the eddy currents $I_{eddy}$ induced in plate 52 must flow in the direction indicated by arrow 68, in accordance with the right hand rule. The magnetic field lines 69 are representative of magnetic field $B_{plate}$. The magnetic fields induced in coil 51 and plate 52 are oriented in opposition to one another, as demonstrated by magnetic field lines 63 and 69, causing plate 52 to be repelled away from coil 51. The repulsion between magnetic field $B_{plate}$ and magnetic field $B_{coil}$ repels plate 52 upward away from coil 51 and causes plate 52 to drive the shaft upward as well.

Figure 3C:
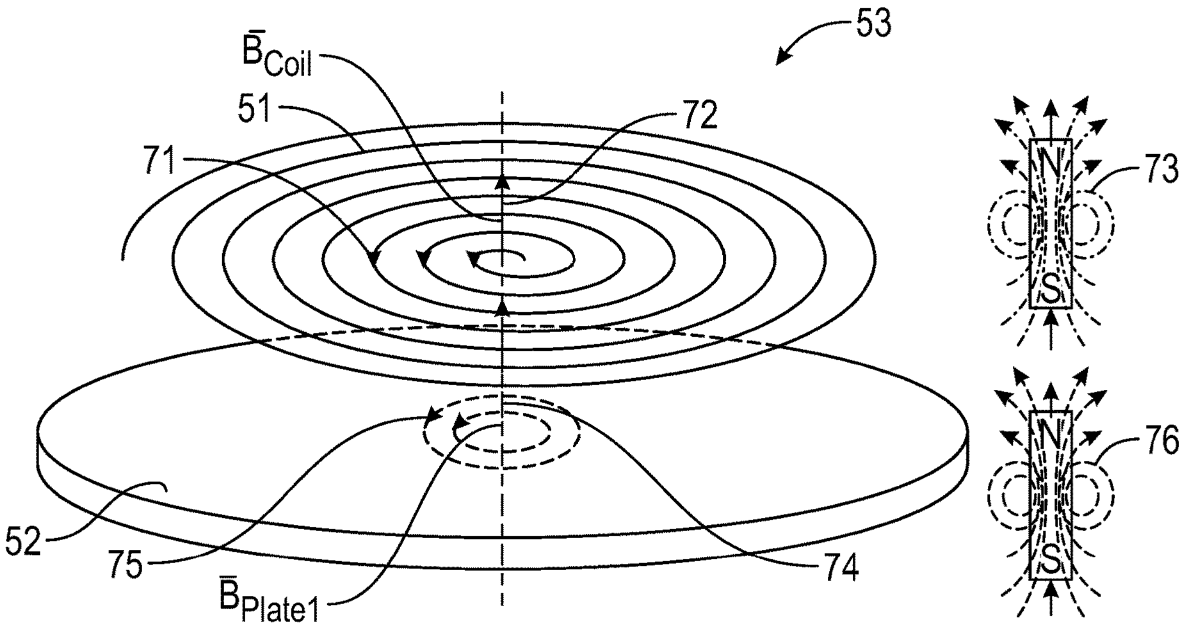
FIGS. 3C-3D are diagrams of magnetic fields produced when a decreasing or constant current is supplied to a coil actuator as described throughout the present disclosure.

FIG. 3C illustrates how a change in current supplied to a coil such as coil 51 can be used to attract a conductive plate such as plate 52 when plate 52 disposed beneath coil 51. A current $I_{coil}$ supplied to coil 51 by the current source flows in the direction indicated by arrow 71. When the current source supplies a decreasing current $I_{coil}$ to the coil 51 (i.e. $dI_{coil}/dt<0$), the magnetic flux $\Phi_{coil}$ of the magnetic field $B_{coil}$ created by the flow of $I_{coil}$ through coil 51 also decreases in the direction shown by arrow 72, in accordance with the right hand rule. Magnetic field lines 73 are representative of magnetic field $B_{coil}$. In accordance with Lenz's law, eddy currents induced in plate 52 due to a change in magnetic field $B_{coil}$ will be oriented so as to oppose the change in flux of magnetic field $B_{coil}$. Because the change in flux (coil of magnetic field $B_{coil}$ is a decrease in flux oriented in the direction indicated by arrow 72, the eddy currents $I_{eddy}$ induced in plate 52 must flow in a direction that creates a magnetic field $B_{plate}$ with a magnetic flux density $\Phi_{plate}$ oriented in the direction indicated by arrow 74. As a result, the eddy currents $I_{eddy}$ induced in plate 52 must flow in the direction indicated by arrow 75, in accordance with the right hand rule. The magnetic field lines 76 are representative of magnetic field $B_{plate}$. The magnetic fields induced in coil 51 and plate 52 are oriented in alignment with one another, as demonstrated by magnetic field lines 73 and 76, causing plate 52 to be attracted toward coil 51. The attraction between magnetic field $B_{plate}$ and magnetic field $B_{coil}$ attracts plate 52 upward toward coil 51 and causes plate 52 to drive the actuator shaft upward as well. It will be appreciated that supplying a constant current $I_{coil}$ to the coil 51 (i.e. $dI_{coil}/dt=0$) generates an attraction force between coil 51 and plate 52 that maintains the dispositions of coil 51 and 52 relative to one another.

Figure 3D:
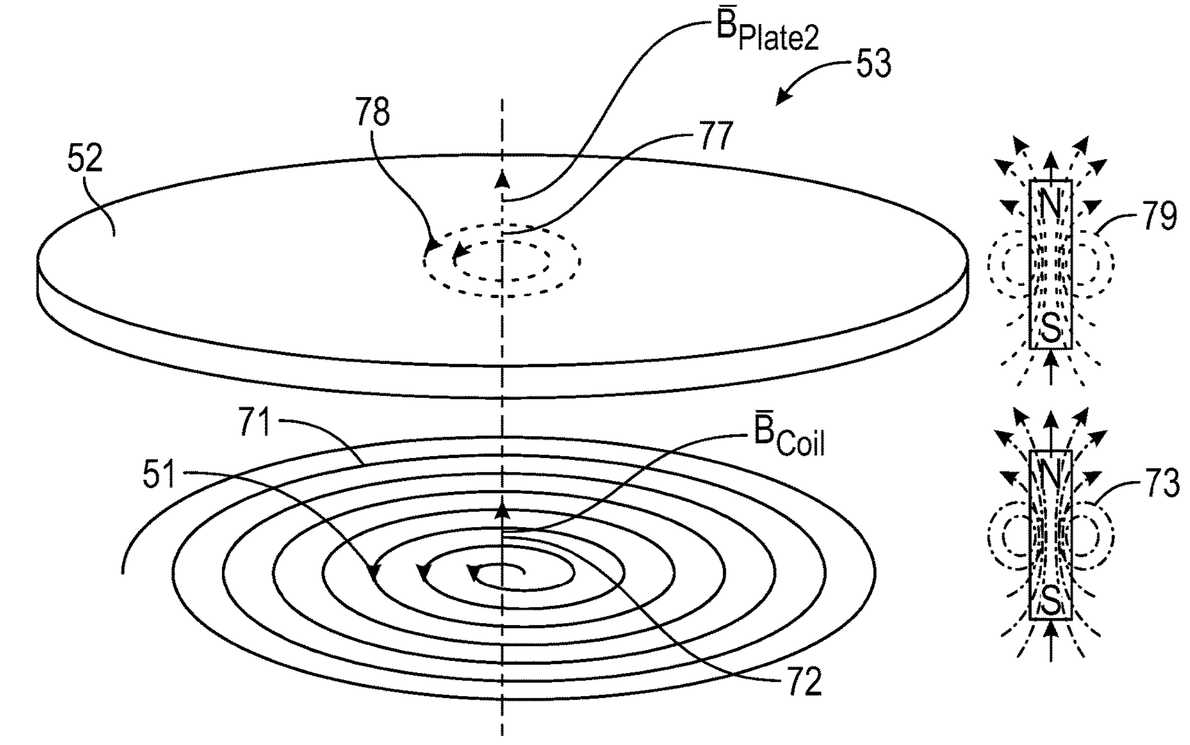

FIG. 3D illustrates how a change in current supplied to a coil such as coil 51 can be used to attract a conductive plate such as plate 52 when plate 52 is disposed above coil 51 rather than beneath coil 51. When a current $I_{coil}$ supplied to coil 51 flows in the direction indicated by arrow 71 and $I_{coil}$ is decreasing (i.e. $dI_{coil}/dt<0$), Lenz's law dictates that the eddy currents $I_{eddy}$ induced in plate 52 must flow in a direction that creates a magnetic field $B_{plate}$ with a magnetic flux $\Phi_{plate}$ oriented in the direction indicated by arrow 77 to oppose the decrease in flux $\Phi_{coil}$ orientated in the direction indicated by arrow 72. As a result, the eddy currents $I_{eddy}$ induced in plate 52 must flow in the direction indicated by arrow 78, in accordance with the right hand rule. The magnetic field lines 79 are representative of magnetic field $B_{plate}$. The magnetic fields induced in coil 51 and plate 52 are oriented in alignment with one another, as demonstrated by magnetic field lines 73 and 79, causing plate 52 to be attracted toward coil 51. The attraction between magnetic field $B_{plate}$ and magnetic field $B_{coil}$ attracts plate 52 downward toward coil 51 and causes plate 52 to drive the shaft downward as well. It will be appreciated that supplying a constant current $I_{coil}$ to the coil 51 (i.e. $dI_{coil}/dt=0$) generates an attraction force between coil 51 and plate 52 that maintains the dispositions of coil 51 and 52 relative to one another.

It will be appreciated that plate 52 was assumed to be at rest in the above descriptions of FIGS. 3A-3D. If plate 52 is already in motion at the time that a time-varying current $I_{coil}$ is supplied to coil 51, the effect of the change in $I_{coil}$ on the motion of plate 52 may differ from the motion described with respect to FIGS. 3A-3D, although the nature of the electromagnetic effects produced by the change in $I_{coil}$ would remain the same. The effect that changes in a current supplied to a coil may have on a plate already in motion will be explained as necessary in the context of describing the subsequent figures.

Figure 4:
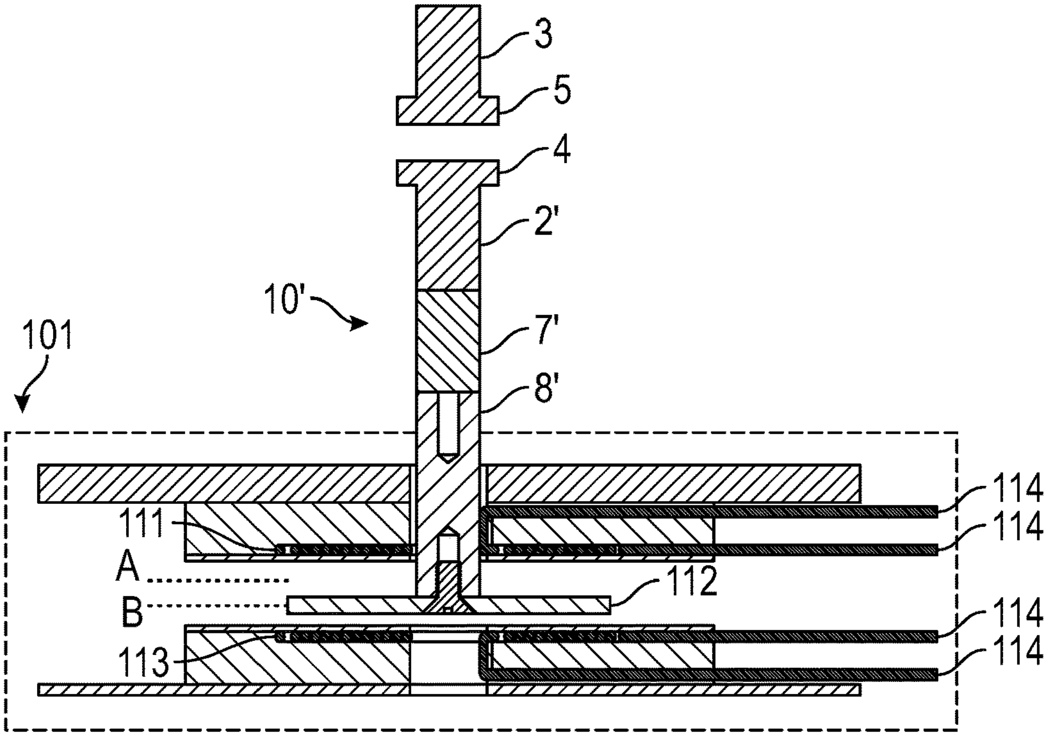
FIG. 4 is a diagram of a coil actuator for a circuit interrupter including two conductive coils and one eddy current plate in accordance with an example embodiment of the disclosed concept.

FIG. 4 shows a cross-sectional view of a coil actuator 101 for a circuit interrupter in accordance with an example embodiment of the disclosed concept. Coil actuator 101 is an example embodiment of the schematic actuator 1 shown in FIGS. 2A and 2B and includes a driving coil 111, an eddy current plate 112, and a damping coil 113. Driving coil 111 and damping coil 113 are each formed from a conductor wound into a coil that lies generally flat relative to a plane that is orthogonal to the viewing plane of FIG. 4. Eddy current plate 112 comprises a plate produced from any electrically conductive material and lies generally flat relative to a plane that is orthogonal to the viewing plane of FIG. 4. Driving coil 111 comprises a central opening through which actuator shaft 8 is disposed. Driving coil 111 and damping coil 113 are fixedly positioned relative to the space surrounding the circuit interrupter and are each electrically connected, via conductors 114, to a current source (not shown) such that the current supplied to the driving coil 111 and the damping coil 113 can be selectively adjusted and turned on and off by a processor (not shown). The eddy current plate 112 is fixedly coupled to the moving assembly 10' such that the exertion of upward or downward forces on the eddy current plate 112 causes corresponding upward or downward movement of the moving assembly 10'.

FIG. 4 depicts the disposition of coil actuator 101 when the separable contacts 4, 5 are open, as shown in FIG. 2B. Dashed line B denotes a position in space aligning with eddy current plate 112 when the separable contacts 4, 5 are in a final open position at the end of an opening stroke of the moving assembly 10'. Dashed line A denotes a position in space aligning with eddy current plate 112 when the separable contacts 4, 5 are closed, as shown in FIG. 2A.

In an example embodiment, when the separable contacts 4, 5 are closed and a fault condition is detected in the circuit interrupter, an opening stroke is initiated by the processor instructing the current source to supply a sudden increase of current $I_{driving}$ to the driving coil 111. One non-limiting example of the shape that the waveform of the sudden increase of current $I_{driving}$ could take is a pulse. One non-limiting example of a current source that can be employed to produce a sudden increase of current includes a capacitor bank that the processor causes to discharge. The present disclosure recites several instances of a sudden increase of current being supplied to a conductor wound into a coil, and it will be appreciated that for any such instance recited in the present disclosure, one non-limiting example of the shape that the waveform of the sudden increase of current can take is a pulse. Accordingly, it will be further appreciated that for any such instance recited in the present disclosure, one non-limiting example of the current source that can be employed to produce the sudden increase of current includes a capacitor bank caused to be discharged by the processor.

When the current source supplies the sudden increase of current $I_{driving}$ to driving coil 111 to initiate the opening stroke, driving coil 111, eddy current plate 112, and $I_{driving}$ are analogous to the coil 51, plate 52, and $I_{coil}$, respectively, described in FIG. 3A. $I_{driving}$ generates a magnetic field $B_{driving}$ with magnetic flux $\Phi_{driving}$, and the sudden increase in $I_{driving}$ produces corresponding changes in $B_{driving}$ and $\Phi_{driving}$. The changes in $B_{driving}$ induce eddy currents $I_{eddy112}$ with magnetic field $B_{eddy112}$ and magnetic flux $\Phi_{eddy112}$ in the eddy current plate 112. $I_{eddy112}$ flows in the direction that causes $\Phi_{eddy112}$ to oppose the changes in $\Phi_{driving}$, as similarly described with respect to FIG. 3A. The opposing orientations of $\Phi_{driving}$ and $\Phi_{eddy112}$ cause driving coil 111 to repel eddy current plate 112 such that eddy current plate 112 moves from alignment with dashed line A toward alignment with dashed line B and the moving stem 2' moves away from the fixed stem 3.

In another example embodiment, shortly after the sudden increase of current $I_{driving}$ is supplied to the driving coil 111 to initiate the opening stroke, the processor instructs the current source to supply a sudden increase of current $I_{damping}$ to the damping coil 113 in order to dampen the velocity of the moving assembly 10' and faster conclude the opening stroke. When damping coil 113 is supplied with $I_{damping}$, damping coil 113, eddy current plate 112, and $I_{damping}$ are analogous to the coil 51, plate 52, and $I_{coil}$, respectively, described in FIG. 3B. $I_{damping}$ generates a magnetic field $B_{damping}$ with magnetic flux $\Phi_{damping}$, and the sudden increase in $I_{damping}$ produces corresponding increases in $B_{damping}$ and $\Phi_{damping}$. The changes in $B_{damping}$ induce new eddy currents $I_{eddy112}$ with magnetic field $B_{eddy112}$ and magnetic flux $\Phi_{eddy112}$ in the eddy current plate 112. $I_{eddy112}$ flows in the direction that causes $\Phi_{eddy112}$ to oppose the increases in $\Phi_{damping}$, as similarly described with respect to FIG. 3B. The opposing orientations of $\Phi_{damping}$ and $\Phi_{eddy112}$ dampen the velocity of the moving assembly 10'. Selecting an appropriate magnitude for $I_{damping}$ facilitates the velocity of the moving assembly 10' approaching 0 m/s when the eddy current plate 112 is in alignment with dashed line B. If optional latch 9 is included in the circuit interrupter, latch 9 would engage when eddy current plate 112 is in alignment with dashed line B in order to keep separable contacts 4, 5 open until the fault condition is cleared.

The principles described in FIGS. 3A-3D can be utilized in a variety of ways to reclose separable contacts 4, 5 when eddy current plate 112 is in the final open position. In one non-limiting example, an increasing current can be supplied to damping coil 113 to initiate a closing stroke. The increasing current supplied to damping coil 113 generates repulsive forces between eddy current plate 112 and damping coil 113 such that eddy current plate 112 moves upward and drives moving stem 8' upward as well. It will be appreciated that current supplied to initiate a closing stroke may be of a smaller magnitude than the currents supplied to driving coil 111 and damping coil 113 to initiate and dampen the opening stroke in order to minimize the impact between separable contacts 4, 5 upon reclosing. In another non-limiting example, a decreasing current can be supplied to driving coil 111 to initiate a closing stroke. The decreasing current would generate an attraction force between eddy current plate 112 and driving coil 111 that would also move eddy current plate 112 upward and drive moving stem 8' upward.

Figure 5:
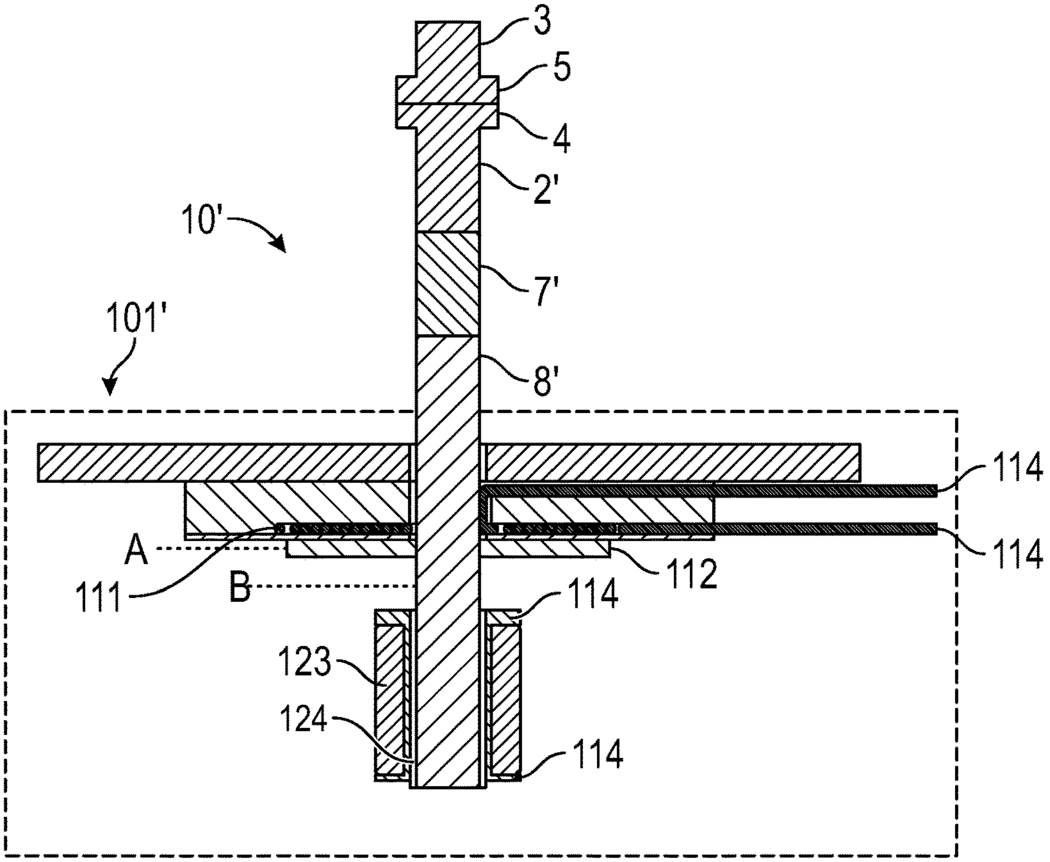
FIG. 5 is a diagram of a coil actuator for a circuit interrupter including a conductive coil, an eddy current plate, and a solenoid coil in accordance with an example embodiment of the disclosed concept.

FIG. 5 shows a cross-sectional view of a coil actuator 101' for a circuit interrupter in accordance with another example embodiment of the disclosed concept. Coil actuator 101' is an alternative embodiment of coil actuator 101 shown in FIG. 4 that comprises the same driving coil 111 and eddy current plate 112 as coil actuator 101, but that comprises a solenoid coil 123 (shown schematically) with a solenoid core 124 in place of damping coil 113. Solenoid coil 123 is formed from a conductor wound into a solenoid around solenoid core 124 and is electrically connected, via conductors 114, to a current source (not shown) such that the current supplied to solenoid coil 123 can be selectively adjusted and turned on and off by a processor (not shown). Solenoid core 124 can be formed from any conductive material and comprises an open cylinder enclosing a length of the actuator shaft 8' that is approximately the same length as solenoid coil 123. The diameters of both solenoid coil 123 and solenoid core 124 are parallel to a plane orthogonal to the viewing plane of FIG. 5. Solenoid coil 123 and solenoid core 124 are fixedly positioned relative to the space surrounding the circuit interrupter. Solenoid core 124 serves as a conduit for the magnetic field produced by solenoid coil 123 when current is supplied to solenoid coil 123.

Figure 6:
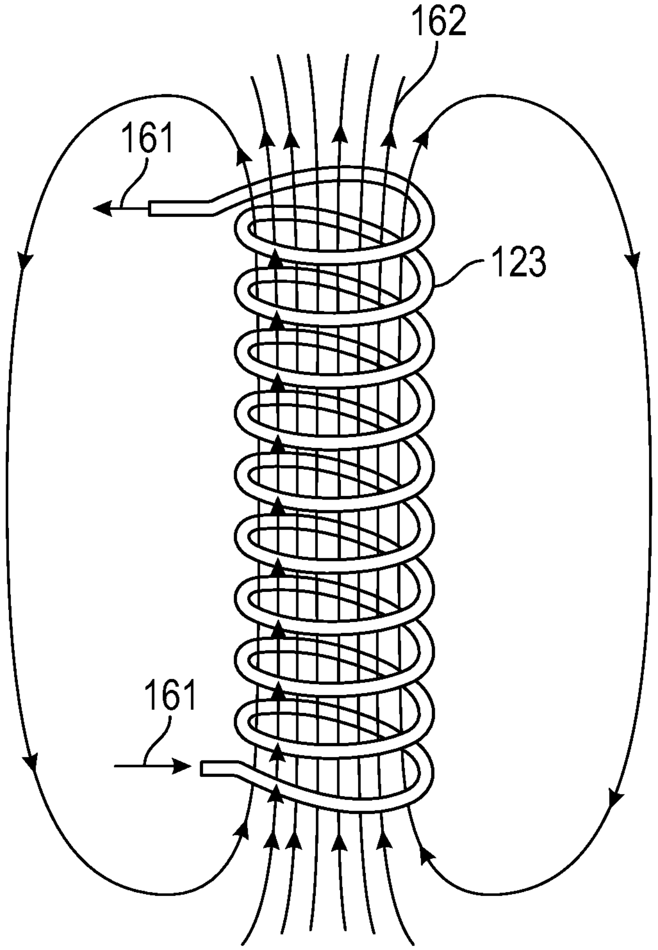
FIG. 6 is a diagram of representative magnetic fields produced when current is supplied to the coil actuator shown in FIG. 5, in accordance with an example embodiment of the disclosed concept.

FIG. 5 depicts the disposition of coil actuator 101 when the separable contacts 4, 5 are closed, as shown in FIG. 2A. When a sudden increase of current is supplied to solenoid coil 123 shortly after an opening stroke is initiated, solenoid coil 123 dampens the velocity of the moving assembly 10' in order to end the opening stroke. FIG. 6 shows a diagram of a representative magnetic field produced when current is supplied to solenoid coil 123 and is subsequently described in further detail.

The magnetic field depicted in FIG. 6 is representative of the magnetic field generated when a current $I_{solenoid}$ flowing in the direction indicated by arrows 161 is supplied to the solenoid coil 123 of FIG. 5. When $I_{solenoid}$ is increasing, magnetic flux $\Phi_{solenoid}$ of the magnetic field $B_{solenoid}$ created by the flow of $I_{solenoid}$ through solenoid coil 123 also increases in the direction shown by arrows 162, in accordance with the right hand rule. When a sudden increase of $I_{solenoid}$ is supplied to solenoid coil 123 in order to damp the downward velocity of moving assembly 10' during an opening stroke, solenoid coil 123, eddy current plate 112, and $I_{solenoid}$ are analogous to the coil 51, plate 52, and $I_{coil}$, respectively, described in FIG. 3B. $I_{eddy112}$ flows in the direction that causes $\Phi_{eddy112}$ to oppose the changes in the magnetic flux $\Phi_{solenoid}$, as similarly described with respect to FIG. 3B. The opposing orientations of $\Phi_{solenoid}$ and $\Phi_{eddy112}$ dampen the downward velocity of eddy current plate 112 such that the velocity of velocity of the moving assembly 10' approaches 0 m/s when the eddy current plate 112 is in alignment with dashed line B.

Figure 7:
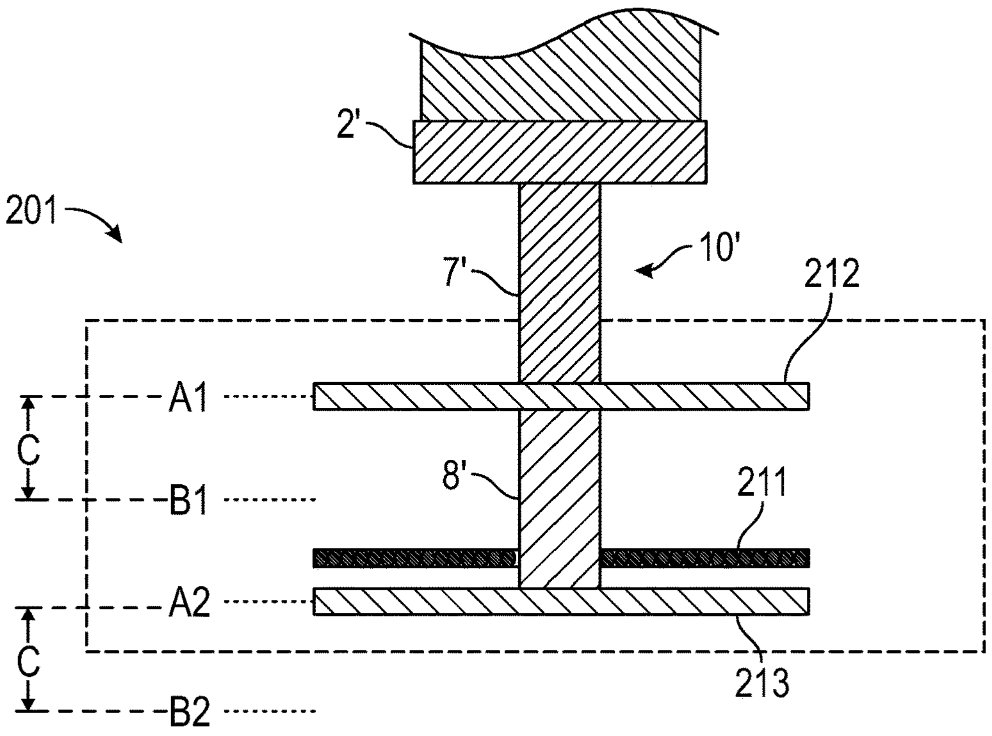
FIG. 7 is a diagram of a coil actuator for a circuit interrupter including two eddy current plates and one conductive coil disposed between the two eddy current plates in accordance with an example embodiment of the disclosed concept.

FIG. 7 shows a cross-sectional view of a coil actuator 201 for a circuit interrupter in accordance with another example embodiment of the disclosed concept. Coil actuator 201 is an example embodiment of the schematic actuator 1 shown in FIGS. 2A and 2B and includes a conductive coil 211, a top eddy current plate 212, and a bottom eddy current plate 213. Coil 211 is formed from a conductor wound into a coil that lies generally flat relative to a plane that is orthogonal to the viewing plane of FIG. 7. Top eddy current plate 212 and bottom eddy current plate 213 each comprise a plate that lies generally flat relative to a plane that is orthogonal to the viewing plane of FIG. 7 and can be produced from any electrically conductive material. In furtherance of the objective of minimizing the mass of the moving assembly 10', top eddy current plate 212 and bottom eddy current plate 213 are produced from low mass materials in order to further maximize the velocity at which the moving assembly 10' can open separable contacts 4, 5. The coil 211, top eddy current plate 212, and bottom eddy current plate 213 each comprise a central opening through which actuator shaft 8 is disposed. Coil 211 is fixedly positioned relative to the space surrounding the circuit interrupter and electrically connected to a current source (not shown) that can be selectively turned on and off by a processor (not shown). The top eddy current plate 212 and bottom eddy current plate 213 are both fixedly coupled to the moving assembly 10' such that the exertion of upward or downward forces on either the top eddy current plate 212 or bottom eddy current plate 213 causes corresponding upward or downward movement of the moving assembly 10'.

FIG. 7 depicts the disposition of coil actuator 201 when the separable contacts 4, 5 are closed, as shown in FIG. 2A. Dashed line A1 denotes the position in space aligning with the top eddy current plate 212 and dashed line A2 denotes the position in space aligning with the bottom eddy current plate 213 when the separable contacts 4, 5 are closed. Dashed line B1 denotes the position in space aligning with the top eddy current plate 212 and dashed line B2 denotes the position in space aligning with the bottom eddy current plate 213 when the separable contacts 4, 5 are open, as shown in FIG. 2B. The distance C between dashed line A1 and dashed line B1 is equal to the distance C between dashed line A2 and dashed line B2.

In an example embodiment, when the separable contacts 4, 5 are closed and a fault condition is detected in the circuit interrupter, an opening stroke is initiated by the processor instructing the current source to supply a first sudden increase of current $I_{coil211}$ to the coil 211. When coil 211 is supplied with the first sudden increase of $I_{coil211}$, coil 211, bottom eddy current plate 213, and $I_{driving}$ are analogous to the coil 51, plate 52, and $I_{coil}$, respectively, described in FIG. 3A. $I_{coil211}$ generates a magnetic field $B_{coil211}$ with magnetic flux $\Phi_{coil211}$, and the sudden increase in $I_{coil211}$ produces corresponding increases in $B_{coil211}$ and $\Phi_{coil211}$. The changes in $B_{coil211}$ induce eddy currents $I_{eddy,bottom}$ with magnetic field $H_{eddy,bottom}$ and magnetic flux $\Phi_{eddy,bottom}$ in the bottom eddy current plate 213. $I_{eddy,bottom}$ flows in the direction that causes $\Phi_{eddy,bottom}$ to oppose the increase in $\Phi_{coil211}$, as similarly described with respect to FIG. 3A. The opposing orientations of $\Phi_{coil211}$ and $\Phi_{eddy,bottom}$ cause coil 211 to repel bottom eddy current plate 213 such that eddy current plate 213 moves from alignment with dashed line A2 toward alignment with dashed line B2 while top eddy current plate 212 simultaneously moves from alignment with dashed line A1 toward alignment with dashed line B1 and the moving stem 2' moves away from the fixed stem 3.

In another example embodiment, shortly after the first sudden increase of current $I_{coil211}$ is supplied to coil 211 to initiate the opening stroke, the processor instructs the current source to supply a second sudden increase of current $I_{coil211}$ to coil 211 in order to dampen the velocity of the moving assembly 10' and faster conclude the opening stroke. When the second sudden increase of current $I_{coil211}$ is supplied, coil 211, top eddy current plate 212, and $I_{coil211}$ are analogous to the coil 51, plate 52, and $I_{coil}$, respectively, described in FIG. 3B. As occurred in response to the first sudden increase of $I_{coil211}$, the second sudden increase of $I_{coil211}$ produces corresponding increases in $B_{coil211}$ and $\Phi_{coil211}$. The changes in $B_{coil211}$ induce new eddy currents $I_{eddy,top}$ with magnetic field $H_{eddy,top}$ and magnetic flux $\Phi_{eddy,top}$ in the top eddy current plate 212. $I_{eddy,top}$ flows in the direction that causes ($\Phi_{eddy,top}$ to oppose the increase in the magnetic flux $\Phi_{coil211}$, as similarly described with respect to FIG. 3B. The opposing orientations of $\Phi_{coil211}$ and $\Phi_{eddy,top}$ dampen the velocity of the moving assembly 10' and selecting an appropriate magnitude for $I_{coil211}$ facilitates the velocity of the moving assembly 10' approaching 0 m/s when the top eddy current plate 212 is in alignment with dashed line B1 and bottom eddy current plate 213 is in alignment with dashed line B2. If optional latch 9 is included in the circuit interrupter, latch 9 would engage when the eddy current plates 212, 213 are in alignment with dashed lines B1, B2 in order to keep separable contacts 4, 5 open until the fault condition is cleared.

The principles described in FIGS. 3A-3D can be utilized in a variety of ways to reclose separable contacts 4, 5 when top eddy current plate 212 and bottom eddy current plate 213 are in the final open position. In one non-limiting example, an increasing current can be supplied to coil 211 to initiate a closing stroke. The increasing current supplied to coil 211 generates repulsive forces between top eddy current plate 212 and coil 211 such that eddy current plate 212 moves upward and drives moving stem 8' upward as well. It will be appreciated that current supplied to initiate a closing stroke may be of a smaller magnitude than the currents supplied to coil 211 to initiate and dampen the opening stroke in order to minimize the impact between separable contacts 4, 5 upon reclosing.

It will also be appreciated that top eddy current plate 212 and bottom eddy current plate 213 can be produced from different materials and/or be given different geometries from one another in order to optimize each eddy current plate for different functions. In one non-limiting example, the material from which top eddy current plate 212 is produced could have a different resistivity than the material from which bottom eddy current plate 213 is produced. In general, the repulsion between a conductive coil and a conductive plate with lower resistivity will be greater than the repulsion between a conductive coil and a conductive plate with higher resistivity. Non-limiting examples of each eddy current plate being optimized for particular functions include: optimizing top eddy current plate 212 for maximizing the velocity of the opening stroke of moving assembly 10' and optimizing bottom eddy current plate 213 for damping the opening stroke.

Figure 8:
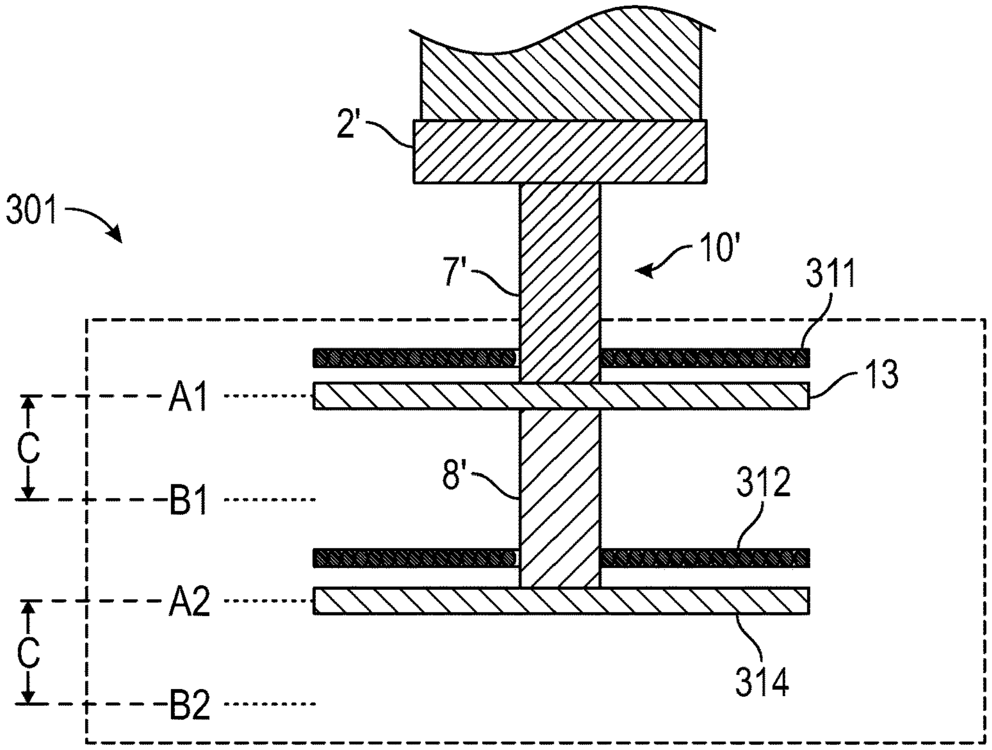
FIG. 8 is a diagram of a coil actuator for a circuit interrupter including two conductive coils and two eddy current plates in accordance with an example embodiment of the disclosed concept.

FIG. 8 shows a cross-sectional view of a coil actuator 301 for a circuit interrupter in accordance with another example embodiment of the disclosed concept. Coil actuator 301 is an example embodiment of the schematic actuator 1 shown in FIGS. 2A and 2B and includes a primary accelerating coil 311, a primary damping coil 312, an inner eddy current plate 313, and an outer eddy current plate 314. Primary accelerating coil 311 and primary damping coil 312 are each formed from a conductor wound into a coil that lies generally flat relative to a plane that is orthogonal to the viewing plane of FIG. 8. Inner eddy current plate 313 and outer eddy current plate 314 each comprise a plate that lies generally flat relative to a plane that is orthogonal to the viewing plane of FIG. 8 and can be produced from any electrically conductive material. In furtherance of the objective of minimizing the mass of the moving assembly 10', inner eddy current plate 313 and outer eddy current plate 314 are produced from low mass materials in order to further maximize the velocity at which the moving assembly 10' can move in order to open the separable contacts 4, 5.

The primary accelerating coil 311, primary damping coil 312, inner eddy current plate 313, and outer eddy current plate 314 each comprise a central opening through which actuator shaft 8 is disposed. Primary accelerating coil 311 and primary damping coil 312 are each fixedly positioned relative to the space surrounding the circuit interrupter and electrically connected to a current source (not shown) that can be selectively turned on and off by a processor (not shown). The inner eddy current plate 313 and outer eddy current plate 314 are fixedly coupled to the moving assembly 10' such that the exertion of upward or downward forces on inner eddy current plate 313 or outer eddy current plate 314 causes corresponding upward or downward movement of the moving assembly 10'.

FIG. 8 depicts the disposition of coil actuator 301 when the separable contacts 4, 5 are closed, as shown in FIG. 2A. Dashed line A1 denotes the position in space aligning with the inner eddy current plate 313 and dashed line A2 denotes the position in space aligning with the outer eddy current plate 314 when the separable contacts 4, 5 are closed. Dashed line B1 denotes the position in space aligning with the inner eddy current plate 313 and dashed line B2 denotes the position in space aligning with the outer eddy current plate 314 when the separable contacts 4, 5 are open, as shown in FIG. 2B. The distance C between dashed line A1 and dashed line B1 is equal to the distance C between dashed line A2 and dashed line B2.

Figure 9A:
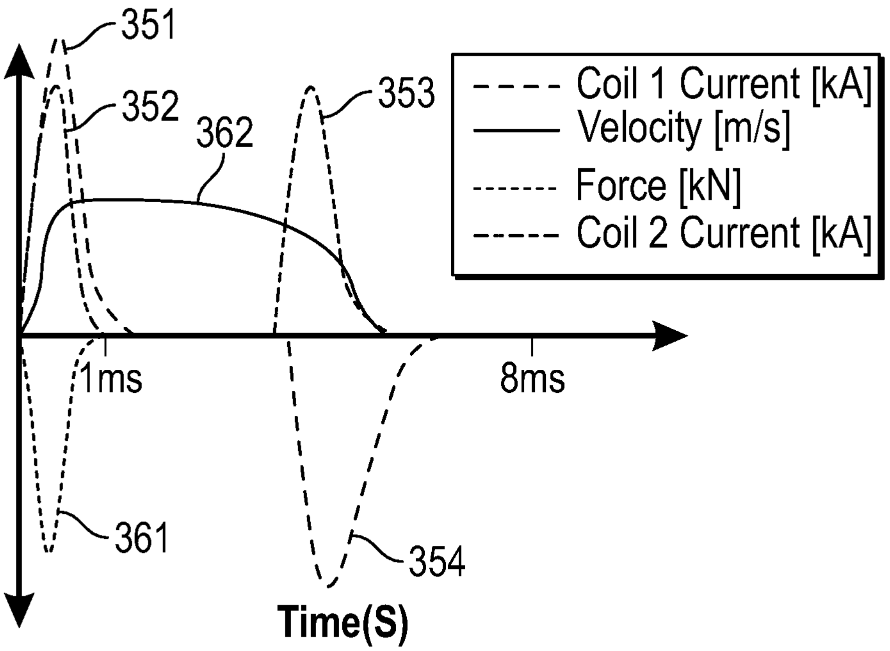
FIG. 9A is a graph of an example current profile that may be supplied to the coil actuator shown in FIG. 8 in accordance with an example embodiment of the disclosed concept.

In an example embodiment, when the separable contacts 4, 5 are closed and a fault condition is detected in the circuit interrupter, an opening stroke is initiated by the processor instructing the current source to supply a sudden increase of current $I_{accel}$ to the primary accelerating coil 311. The graph in FIG. 9A shows example waveforms of current that can be supplied to primary accelerating coil 311 and primary damping coil 312 during an opening stroke, and the sudden increase of current $I_{accel}$ supplied to the primary accelerating coil 311 to initiate an opening stroke is represented by pulse 351 in FIG. 9A. When primary accelerating coil 311 is supplied with $I_{accel}$, primary accelerating coil 311, inner eddy current plate 313, and $I_{accel}$ are analogous to the coil 51, plate 52, and $I_{coil}$, respectively, described in FIG. 3A. $I_{accel}$ generates a magnetic field $B_{accel}$ with magnetic flux $\Phi_{accel}$, and the sudden increase in $I_{accel}$ produces corresponding increases in $B_{accel}$ and $\Phi_{accel}$. The changes in $B_{accel}$ induce eddy currents $I_{eddy,inner}$ with magnetic field $B_{eddy,inner}$ and magnetic flux $\Phi_{eddy,inner}$ in the inner eddy current plate 313. $I_{eddy}$, inner flows in the direction that causes $\Phi_{eddy,inner}$ to oppose the increase in $\Phi_{accel}$, as similarly described with respect to FIG. 3A. The opposing orientations of $\Phi_{accel}$ and $\Phi_{eddy,inner}$ cause primary accelerating coil 311 to repel inner eddy current plate 313 such that inner eddy current plate 313 moves from alignment with dashed line A1 toward alignment with dashed line B1 while outer eddy current plate 314 simultaneously moves from alignment with dashed line A2 toward alignment with dashed line B2 and the moving stem 2' moves away from the fixed stem 3.

In another example embodiment, primary damping coil 312 also generates electromagnetic forces to supplement the electromagnetic forces generated by primary accelerating coil 311 to initiate an opening stroke. In this example embodiment, the processor instructs the current source to supply a sudden increase of current $I_{damp}$ to the primary damping coil 312 at the same time $I_{accel}$ is supplied to primary accelerating coil 311. The sudden increase of current $I_{damp}$ supplied to the primary damping coil 312 to initiate the opening stroke is represented by pulse 352 in FIG. 9A. When primary damping coil 312 is supplied with $I_{damp}$, primary damping coil 312, outer eddy current plate 314, and $I_{damp}$ are analogous to the coil 51, plate 52, and $I_{coil}$, respectively, described in FIG. 3A. $I_{damp}$ generates a magnetic field $B_{damp}$ with magnetic flux $\Phi_{damp}$, and the sudden increase in $I_{damp}$ produces corresponding increases in $B_{damp}$ and $(I_{damp}$. The changes in $B_{damp}$ induce eddy currents $I_{eddy,outer}$ with magnetic field $B_{eddy,outer}$ and magnetic flux $\Phi_{eddy,outer}$ in the outer eddy current plate 314. $I_{eddy,outer}$ flows in the direction that causes $\Phi_{eddy,outer}$ to oppose the increase in $\Phi_{damp}$, as similarly described with respect to FIG. 3A. The opposing orientations of $\Phi_{damp}$ and $\Phi_{eddy,outer}$ cause primary damping coil 313 to repel outer eddy current plate 314, contributing to the movement of moving stem 2' away from fixed stem 3.

In yet another example embodiment, after the opening stroke is initiated, the processor instructs the current source to supply a sudden increase of damping current $I_{damp}$ to primary damping coil 312 in order to dampen the velocity of the moving assembly 10' and faster conclude the opening stroke. The sudden increase of damping current $I_{damp}$ supplied to the primary damping coil 312 is represented by pulse 353 in FIG. 9A. When primary damping coil 312 is supplied with $I_{damp}$, primary damping coil 312, inner eddy current plate 313, and $I_{damp}$ are analogous to the coil 51, plate 52, and $I_{coil}$, respectively, described in FIG. 3B. $I_{damp}$ generates a magnetic field $B_{damp}$ with magnetic flux Φdamp, and the sudden increase in $I_{damp}$ produces corresponding increases in $B_{damp}$ and $\Phi_{damp}$. The changes in $B_{damp}$ induce new eddy currents $I_{eddy,inner}$ with magnetic field $B_{eddy,inner}$ and magnetic flux $\Phi_{eddy,inner}$ in the inner eddy current plate 313. $I_{eddy,inner}$ flows in the direction that causes $\Phi_{eddy,inner}$ to oppose the increase in the magnetic flux $\Phi_{damp}$, as similarly described with respect to FIG. 3B. The opposing orientations of $\Phi_{damp}$ and $\Phi_{eddy,inner}$ dampen the velocity of the moving assembly 10'. Selecting an appropriate magnitude for $I_{damp}$ facilitates the velocity of the moving assembly 10' approaching 0 m/s when inner eddy current plate 313 is in alignment with dashed line B1. If optional latch 9 is included in the circuit interrupter, latch 9 would engage when inner eddy current plate 313 is in alignment with dashed line B1 in order to keep separable contacts 4, 5 open until the fault condition is cleared.

In a further example embodiment, primary accelerating coil 311 also generates electromagnetic forces to supplement damping of the opening stroke. In this example embodiment, the processor instructs the current source to supply a sudden decrease of current $I_{accel}$ to the primary accelerating coil 311 shortly after the damping current $I_{damp}$ is supplied to primary damping coil 312 to dampen the velocity of the moving assembly 10'. The sudden decrease of current $I_{accel}$ supplied to primary damping coil 312 to dampen the opening stroke is represented by pulse 354 in FIG. 9A. When primary accelerating coil 311 is supplied with damping current $I_{accel}$, primary accelerating coil 311, inner eddy current plate 313, and $I_{accel}$ are analogous to the coil 51, plate 52, and $I_{coil}$, respectively, described in FIG. 3C. $I_{accel}$ generates a magnetic field $B_{accel}$ with magnetic flux $\Phi_{accel}$, and the sudden decrease in $I_{accel}$ produces corresponding decreases in $B_{accel}$ and $\Phi_{accel}$. The changes in $B_{accel}$ induce eddy currents $I_{eddy,inner}$ with magnetic field $B_{eddy,inner}$ and magnetic flux $\Phi_{eddy,inner}$ in the inner eddy current plate 313. $I_{eddy,inner}$ flows in the direction that causes $\Phi_{eddy,inner}$ to oppose the decrease in $\Phi_{damp}$, as similarly described with respect to FIG. 3C, and generates attraction forces between primary accelerating coil 311 and inner eddy current plate 313 that are oriented in the same direction as the repulsive forces between primary damping coil 312 and inner eddy current plate 313 during damping.

The principles described in FIGS. 3A-3D can be utilized in a variety of ways to reclose separable contacts 4, 5. In one non-limiting example, an increasing current can be supplied to primary damping coil 312 to initiate a closing stroke. The increasing current supplied to primary damping coil 312 generates repulsive forces between inner eddy current plate 313 and damping coil 312 such that inner eddy current plate 313 moves upward and drives moving stem 8' upward as well. In another non-limiting example, a decreasing current can be supplied to primary accelerating coil 311 to initiate a closing stroke. The decreasing current would generate an attraction force between primary accelerating coil 311 and inner eddy current plate 313 that would also move inner eddy current plate 313 upward and drive moving stem 8' upward. It will be appreciated that currents supplied to initiate a closing stroke may be of a smaller magnitude than the currents supplied to primary accelerating coil 311 and primary damping coil 312 to initiate and dampen the opening stroke in order to minimize the impact between separable contacts 4, 5 upon reclosing.

In FIG. 9A, repulsion force curve 361 represents a cumulative repulsion force, comprised of a repulsion force between primary accelerating coil 311 and inner eddy current plate 313 and a repulsion force between primary damping coil 312 and outer eddy current plate 314, that causes moving stem 2' to move away from fixed stem 3 to initiate an opening stroke. Velocity curve 362 represents the velocity of moving stem 2' over the duration of the opening stroke. The graph of FIG. 9A demonstrates that moving stem 2' reaches maximum velocity shortly after pulses 351, 352 and repulsion force curve 361 peak. In addition, the decrease of velocity curve 362 to 0 m/s closely coincides with the decay of the damping currents supplied to primary damping coil 312 and primary accelerating coil 311 (represented by pulses 353, 354) to 0 m/s.

Figure 9B:
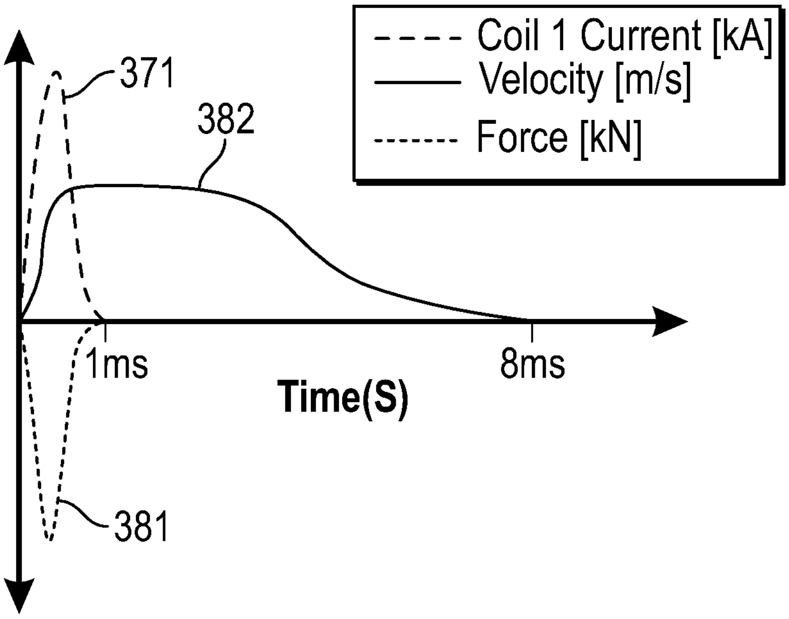
FIG. 9B is a graph of a current profile that may be supplied to known coil actuators.

The effect of using damping currents to dampen an opening stroke is evident when the graph of FIG. 9A is compared to the graph of FIG. 9B. The graph of FIG. 9B represents a coil actuator that does not employ opening stroke damping and uses only one coil to initiate an opening stroke, comparable to coil actuator 301 with primary damping coil 312 and outer eddy current plate 314 omitted. Pulse 371, repulsion force curve 381, and velocity curve 382 are analogous to pulse 351, repulsion force curve 361, and velocity curve 362, respectively. Velocity curve 362 and velocity curve 382 reach similar maximum values; however, velocity curve 362 does not have a noticeable tail and terminates well before the 8-ms mark, whereas velocity curve 382 has a longer tail that extends past the 8-ms mark. The difference in the termination of velocity curve 362 and the termination of velocity curve 382 demonstrates the efficacy of the use of damping current in actuator 301 to dampen the velocity of an opening stroke, as well as the use of damping current in all of the other actuator embodiments described in the present disclosure designed for use in circuit interrupters with lightweight moving assemblies and without contact springs and contact dampeners.

Figure 10:
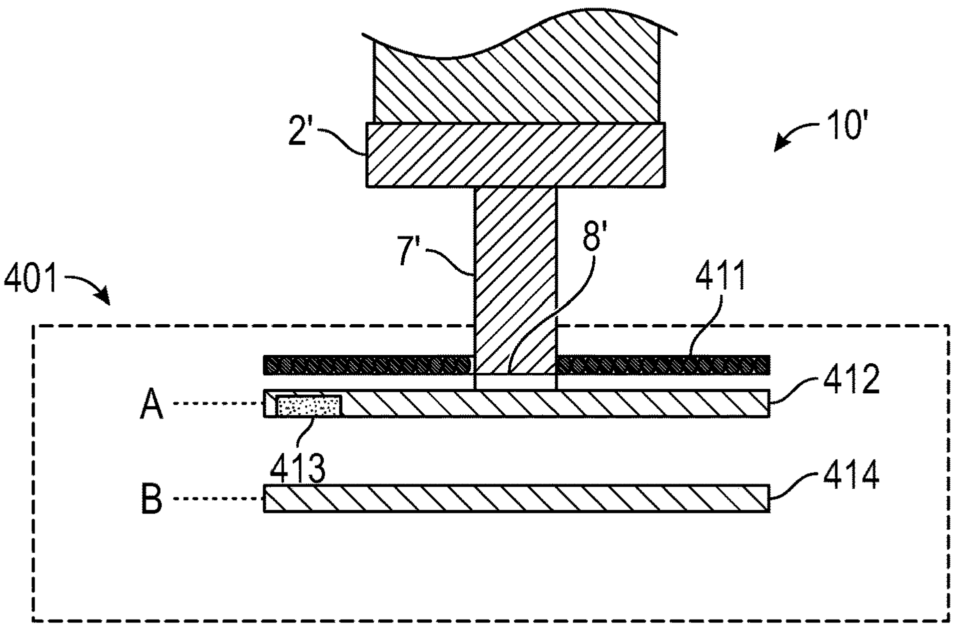
FIG. 10 is a diagram of a coil actuator for a circuit interrupter including two eddy current plates disposed beneath one conductive coil in accordance with an example embodiment of the disclosed concept.

FIG. 10 shows a cross-sectional view of a coil actuator 401 for a circuit interrupter in accordance with another example embodiment of the disclosed concept. Coil actuator 401 is an example embodiment of the schematic actuator 1 shown in FIGS. 2A and 2B and includes a conductive coil 411, a moving eddy current plate 412, and a stationary eddy current plate 414. Coil 411 is formed from a conductor wound into a coil that lies generally flat relative to a plane that is orthogonal to the viewing plane of FIG. 10. Moving eddy current plate 412 and stationary eddy current plate 414 each comprise a plate that lies generally flat relative to a plane that is orthogonal to the viewing plane of FIG. 10 and can be produced from any electrically conductive material. In some example embodiments, moving eddy current plate 412 can additionally comprise an optional magnet 413. In furtherance of the objective of minimizing the mass of the moving assembly 10', moving eddy current plate 412 is produced from low mass materials in order to further maximize the velocity at which the moving assembly 10' can open separable contacts 4, 5.

The coil 411 and moving eddy current plate 412 each comprise a central opening through which actuator shaft 8 is disposed. Coil 411 is fixedly positioned relative to the space surrounding the circuit interrupter and electrically connected to a current source (not shown) that can be selectively turned on and off by a processor (not shown). The moving eddy current plate 412 is fixedly coupled to the moving assembly 10' such that the exertion of upward or downward forces on the moving eddy current plate 412 causes corresponding upward or downward movement of the moving assembly 10'. Stationary eddy current plate 414 is fixedly positioned relative to the space surrounding the circuit interrupter and comprises a central opening through which actuator shaft 8' can pass toward the conclusion of an opening stroke or at the beginning of a closing stroke.

FIG. 10 depicts the disposition of coil actuator 401 when the separable contacts 4, 5 are closed, as shown in FIG. 2A. Dashed line A denotes the position in space aligning with the moving eddy current plate 412 when the separable contacts 4, 5 are closed and dashed line B denotes the position in space aligning with the moving eddy current plate 412 when the separable contacts 4, 5 are open, as shown in FIG. 2B.

In an example embodiment, when the separable contacts 4, 5 are closed and a fault condition is detected in the circuit interrupter, an opening stroke is initiated by the processor instructing the current source to supply a sudden increase of current $I_{coil411}$ to the coil 411. When coil 411 is supplied with the first sudden increase of $I_{coil411}$, coil 411, moving eddy current plate 412, and $I_{coil411}$ are analogous to the coil 51, plate 52, and $I_{coil}$, respectively, described in FIG. 3A. $I_{coil411}$ generates a magnetic field $B_{coil411}$ with magnetic flux $\Phi_{coil411}$, and the sudden increase in $I_{coil411}$ produces corresponding increases in $B_{coil411}$ and $\Phi_{coil411}$. The changes in $B_{coil411}$ induce eddy currents $I_{eddy,moving}$ with magnetic field $H_{eddy,moving}$ and magnetic flux $\Phi_{eddy,moving}$ in the moving eddy current plate 412. $I_{eddy,moving}$ flows in the direction that causes $\Phi_{eddy,moving}$ to oppose the increase in $\Phi_{coil411}$, as similarly described with respect to FIG. 3A. The opposing orientations of $\Phi_{coil411}$ and $\Phi_{eddy,moving}$ cause coil 411 to repel moving eddy current plate 412 such that moving eddy current plate 412 moves from alignment with dashed line A toward alignment with dashed line B and the moving stem 2' moves away from the fixed stem 3.

In an example embodiment in which moving eddy current plate 412 does not comprise the optional magnet 413, as moving eddy current plate 412 moves toward alignment with dashed line B and approaches stationary eddy current plate 414 during an opening stroke, $B_{eddy,moving}$ induces eddy currents $I_{eddy,stationary}$ in stationary eddy current plate 414, provided that the sudden increase of $I_{coil411}$ supplied to coil 411 is sufficient enough in duration to sustain the flow of $I_{eddy,moving}$ in moving eddy current plate 412. When $I_{coil411}$ is increasing, the magnetic flux ($I_{eddy,moving}$ is also increasing. Similarly to how the generation of eddy currents in plate 52 by $B_{coil}$ was described with respect to FIG. 3A, the induced eddy currents $I_{eddy,stationary}$ in stationary eddy current plate 414 flow such that the associated magnetic flux $\Phi_{eddy,stationary}$ opposes the increasing $\Phi_{eddy,moving}$ of moving eddy current plate 412. The opposing orientations of $\Phi_{eddy,stationary}$ and $\Phi_{eddy,moving}$ cause stationary eddy current plate 414 to repel moving eddy current plate 412 and dampen the velocity of the moving stem 2'. Optional latch 9 would be included in this example embodiment to mechanically hold moving eddy current plate 412 in alignment with dashed line B until the fault condition is cleared.

In another example embodiment in which moving eddy current plate 412 does comprise the optional magnet 413, the sudden increase of $I_{coil411}$ supplied to coil 411 to initiate the opening stroke could be shorter in duration than that used in the embodiment in which optional magnet 413 is omitted from moving eddy current plate 412. As moving eddy current plate 412 moves toward alignment with dashed line B and approaches stationary eddy current plate 414 during an opening stroke, the magnetic field $B_{magnet}$ of the magnet 413 induces localized eddy currents $I_{eddy,stationary}$ in stationary eddy current plate 414. It will be appreciated that the magnet 413 is oriented in such a manner as to generate $I_{eddy,stationary}$ to oppose the magnetic flux $\Phi_{magnet}$ of the magnet 413 as moving eddy current plate 412 moves toward stationary eddy current plate 414 and accordingly dampen the velocity of the moving stem 2'. Because magnet 413 can only induce eddy currents in a localized area of stationary eddy current plate 414, it will be appreciated that the eddy currents induced in stationary eddy current plate 414 by magnet 413 will be insufficient for slowing the velocity of the moving stem 2' to 0 m/s when moving eddy current plate 412 is aligned with dashed line B. Accordingly, optional latch 9 would also be included in this example embodiment to mechanically hold moving eddy current plate 412 in alignment with dashed line B until the fault condition is cleared. It will be appreciated that the magnetic field $B_{magnet}$ of magnet 413 can be both strong enough to induce the desired damping eddy currents in stationary eddy current plate 414 and subtle enough to not encumber an opening stroke from being initiated.

The principles described in FIGS. 3A-3D can be utilized in a variety of ways to reclose separable contacts 4, 5 when moving eddy current plate 412 is in the final open position. In one non-limiting example, a decreasing current can be supplied to coil 411 to initiate a closing stroke. The decreasing current supplied to coil 411 generates attraction forces between moving eddy current plate 412 and coil 411 such that moving eddy current plate 412 moves upward and drives moving stem 8' upward as well. It will be appreciated that current supplied to initiate a closing stroke may be of a smaller magnitude than the current supplied to coil 411 to initiate the opening stroke in order to minimize the impact between separable contacts 4, 5 upon reclosing.

Figure 11:
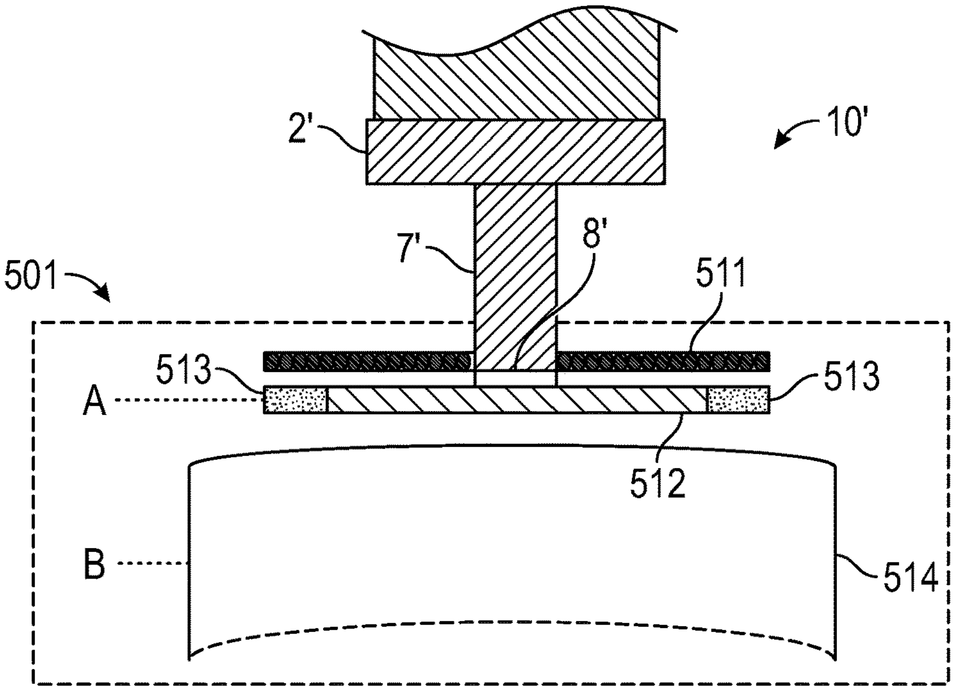
FIG. 11 is a diagram of a coil actuator for a circuit interrupter including one conductive coil, one eddy current plate, and a hollow conductive open cylinder in accordance with an example embodiment of the disclosed concept.

FIG. 11 shows a cross-sectional view of a coil actuator 501 for a circuit interrupter in accordance with another example embodiment of the disclosed concept. Coil actuator 501 is an example embodiment of the schematic actuator 1 shown in FIGS. 2A and 2B and includes a conductive coil 511, an eddy current plate 512, and a conductive tube 514. Coil 511 is formed from a conductor wound into a coil that lies generally flat relative to a plane that is orthogonal to the viewing plane of FIG. 11. Eddy current plate 512 comprises a plate that lies generally flat relative to a plane that is orthogonal to the viewing plane of FIG. 11 and can be produced from any electrically conductive material. Eddy current plate 512 additionally comprises a number of magnets 513 disposed at its outer edges. In furtherance of the objective of minimizing the mass of the moving assembly 10', eddy current plate 512 is produced from low mass materials in order to further maximize the velocity at which the moving assembly 10' can open separable contacts 4, 5. Conductive tube 514 comprises a hollow open cylinder whose diameter lies in a plane that is orthogonal to the viewing plane of FIG. 11 and can be produced from any electrically conductive material that cannot be permanently magnetized. Non-limiting examples of such non-ferromagnetic materials include aluminum and copper.

The coil 511 and eddy current plate 512 each comprise a central opening through which actuator shaft 8 is disposed. Coil 511 is fixedly positioned relative to the space surrounding the circuit interrupter and electrically connected to a current source (not shown) that can be selectively turned on and off by a processor (not shown). The eddy current plate 512 is fixedly coupled to the moving assembly 10' such that the exertion of upward or downward forces on the eddy current plate 512 causes corresponding upward or downward movement of the moving assembly 10'. Conductive tube 514 is fixedly positioned relative to the space surrounding the circuit interrupter and comprises a circumference large enough to allow eddy current plate 512 to pass into the interior of conductive tube 514 toward the conclusion of an opening stroke.

FIG. 11 depicts the disposition of coil actuator 501 when the separable contacts 4, 5 are closed, as shown in FIG. 2A. Dashed line A denotes the position in space aligning with the eddy current plate 512 when the separable contacts 4, 5 are closed and dashed line B denotes the position in space aligning with the eddy current plate 512 when the separable contacts 4, 5 are open, as shown in FIG. 2B.

In an example embodiment, when the separable contacts 4, 5 are closed and a fault condition is detected in the circuit interrupter, an opening stroke is initiated by the processor instructing the current source to supply a sudden increase of current $I_{coil511}$ to the coil 511. When coil 511 is supplied with the sudden increase of $I_{coil511}$, coil 511, eddy current plate 512, and $I_{coil511}$ are analogous to the coil 51, plate 52, and $I_{coil}$, respectively, described in FIG. 3A. $I_{coil511}$ generates a magnetic field $B_{coil511}$ with magnetic flux $\Phi_{coil511}$, and the sudden increase in $I_{coil511}$ produces corresponding increases in $B_{coil511}$ and $\Phi_{coil511}$. The changes in $B_{coil511}$ induce eddy currents $I_{eddy,moving}$ with magnetic field $H_{eddy,moving}$ and magnetic flux $\Phi_{eddy512}$ in the eddy current plate 512. $I_{eddy512}$ flows in the direction that causes $\Phi_{eddy512}$ to oppose the changes in $\Phi_{coil511}$, as similarly described with respect to FIG. 3A. The opposing orientations of $\Phi_{coil511}$ and $\Phi_{eddy512}$ cause coil 511 to repel eddy current plate 512 such that eddy current plate 512 moves from alignment with dashed line A toward alignment with dashed line B and the moving stem 2' moves away from the fixed stem 3.

Figure 12:
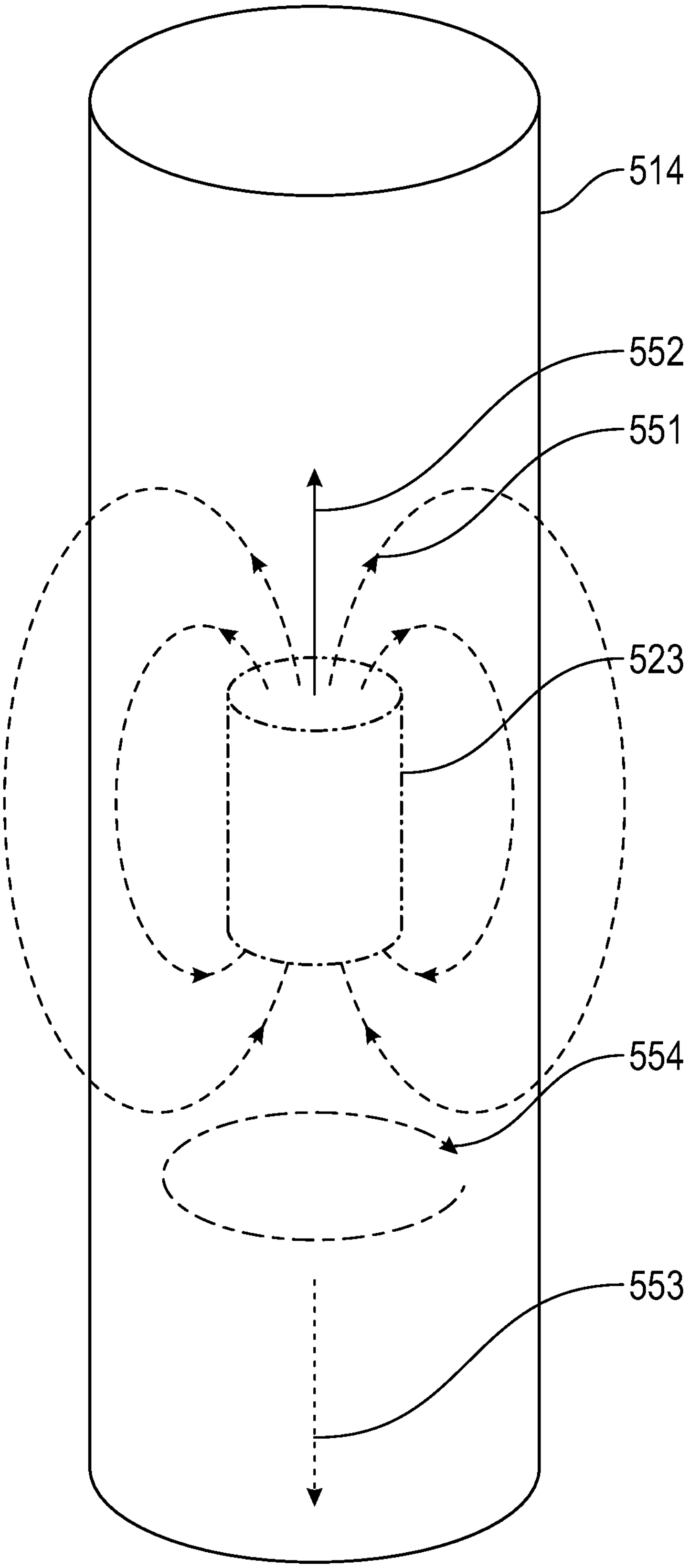
FIG. 12 is a diagram of representative magnetic fields produced when current is supplied to the coil actuator shown in FIG. 11, in accordance with an example embodiment of the disclosed concept.

Damping of the opening stroke is facilitated by magnets 513. FIG. 12 depicts representative electromagnetic fields generated when eddy current plate 512 moves toward alignment with dashed line B in FIG. 11 and travels within conductive tube 514 toward the conclusion of an opening stroke. Magnets 513 from FIG. 11 are represented as magnet 523 in FIG. 12, which is depicted as being disposed toward the center axis of conductive tube 514 in order to streamline the explanation of the electromagnetic effects produced by magnets 513 during an opening stroke. Magnets 513 are oriented such that the magnetic field lines of their magnetic field $B_{magnet513}$ are represented by arrows 551 and the associated magnetic flux $\Phi_{magnet513}$ is represented by arrow 552. As eddy current plate 512 moves toward alignment with dashed line B, $H_{magnet513}$ induces eddy currents $I_{eddy,tube}$ within the wall of conductive tube 514. Because eddy current plate 512 and magnets 513 accelerate due to gravity during an opening stroke, $\Phi_{magnet513}$ increases as eddy current plate 512 moves toward alignment with dashed line B. Accordingly, Lenz's law dictates that $I_{eddy,tube}$ must flow in a direction that creates a magnetic field $H_{eddy,tube}$ with a magnetic flux $\Phi_{eddy,tube}$ oriented in the direction indicated by arrow 553 to oppose the increase in flux $\Phi_{magnet513}$ orientated in the direction indicated by arrow 552. As a result, the eddy currents $I_{eddy,tube}$ must flow in the direction indicated by arrow 554, in accordance with the right hand rule. The opposing orientations of $\Phi_{magnet513}$ and $\Phi_{eddy,tube}$ dampen the downward velocity of eddy current plate 512.

It will be appreciated that the eddy currents $I_{eddy,tube}$ induced in conductive tube 514 by magnets 513 may be insufficient for slowing the velocity of the moving stem 2' to 0 m/s when eddy current plate 512 is in alignment with dashed line B. Accordingly, optional latch 9 would be included in this example embodiment to mechanically hold eddy current plate 512 in alignment with dashed line B until the fault condition is cleared. It will be appreciated that the magnetic field $B_{magnet513}$ of magnets 513 can be both strong enough to induce the desired damping eddy currents in conductive tube 514 and subtle enough to not encumber an opening stroke from being initiated.

The principles described in FIGS. 3A-3D can be utilized in a variety of ways to reclose separable contacts 4, 5 when moving eddy current plate 412 is in the final open position. In one non-limiting example, a decreasing current can be supplied to coil 511 to initiate a closing stroke. The decreasing current supplied to coil 511 generates attraction forces between eddy current plate 512 and coil 511 such that eddy current plate 512 moves upward and drives moving stem 8' upward as well. It will be appreciated that current supplied to initiate a closing stroke may be of a smaller magnitude than the current supplied to coil 511 to initiate the opening stroke in order to minimize the impact between separable contacts 4, 5 upon reclosing.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An actuator structured to be coupled to a moving stem of a circuit interrupter in order to open and close separable contacts of the circuit interrupter, the actuator comprising:

a shaft;

a first coil member; and a first eddy current member coupled to the shaft and disposed above the first coil member such that the first eddy current member is disposed between the first coil member and the shaft, wherein the first coil member is structured to be electrically connected to a first current source, wherein the first eddy current member is structured to move in response to a change in current supplied to the first coil member, wherein the actuator is configured to stop movement of the first eddy current member in response to changes in a damping current supplied to the first coil member, and wherein the actuator does not comprise a contact dampener and is configured to stop movement of the first eddy current member during opening of the separable contacts without a contact dampener.

2. The actuator of claim 1, further comprising:

a second coil member having an opening through which the shaft passes and disposed above the first eddy current member, wherein the second coil member is structured to be electrically connected to a second current source, and wherein the first eddy current member is structured to move in response to changes in a current supplied to the first coil member or the second coil member.

3. The actuator of claim 2, wherein the actuator is structured to maintain the first eddy current member in an open position using only the first coil member and the second coil member and without mechanically latching the first eddy current member, the open position being that in which the separable contacts are separated.

4. The actuator of claim 1, further comprising:

a second coil member having an opening through which the shaft passes and disposed above the first eddy current member; and a solenoid core having an opening through which the shaft passes and disposed between the opening of the first coil member and the shaft, wherein the first coil member comprises a solenoid, wherein the second coil member is structured to be electrically connected to a second current source, and wherein the first eddy current member is structured to move in response to changes in a current supplied to the second coil member.

5. The actuator of claim 4, wherein the actuator is coupled to a moving stem of a circuit interrupter, and wherein movement of the first eddy current member causes the moving stem to open and close separable contacts of the circuit interrupter.

6. The actuator of claim 1, further comprising:

a second eddy current member having an opening through which the shaft passes and coupled to the shaft at a location disposed beneath the first coil member, and wherein the second eddy current member is structured to move in response to changes in a current supplied to the first coil member.

7. The actuator of claim 6, wherein the actuator is coupled to a moving stem of a circuit interrupter, and wherein movement of the first eddy current member and second eddy current member causes the moving stem to open and close separable contacts of the circuit interrupter.

8. The actuator of claim 2, further comprising:

a second eddy current member comprising an opening through which the shaft passes and coupled to the shaft at a location disposed beneath the first coil member, wherein the second eddy current member is structured to move in response to changes in a current supplied to the first coil member.

9. The actuator of claim 8, wherein the actuator is coupled to a moving stem of a circuit interrupter, and wherein movement of the first eddy current member and second eddy current member causes the moving stem to open and close separable contacts of the circuit interrupter.

* * * * *